US009955506B2

(12) United States Patent
Rahman et al.

(10) Patent No.: US 9,955,506 B2
(45) Date of Patent: Apr. 24, 2018

(54) ADAPTING CARRIER AGGREGATION CONFIGURATIONS FOR USER EQUIPMENT

(71) Applicant: Telefonaktiebolaget L M Ericsson (publ), Stockholm (SE)

(72) Inventors: Imadur Rahman, Sollentuna (SE); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 199 days.

(21) Appl. No.: 14/663,828

(22) Filed: Mar. 20, 2015

(65) Prior Publication Data

US 2015/0271852 A1    Sep. 24, 2015

Related U.S. Application Data

(60) Provisional application No. 61/968,756, filed on Mar. 21, 2014.

(51) Int. Cl.
*H04W 4/00* (2018.01)
*H04W 74/08* (2009.01)
(Continued)

(52) U.S. Cl.
CPC ......... *H04W 74/0833* (2013.01); *H04L 5/001* (2013.01); *H04L 5/0098* (2013.01); *H04W 28/0247* (2013.01); *H04W 72/0413* (2013.01)

(58) Field of Classification Search
CPC ......... H04L 5/003; H04L 5/001; H04W 74/06
(Continued)

(56) References Cited

U.S. PATENT DOCUMENTS

2007/0189256 A1*  8/2007  Oh ................. H04W 74/06 370/338
2009/0183168 A1*  7/2009  Uchida ............ G06F 9/5027 718/104

(Continued)

FOREIGN PATENT DOCUMENTS

EP    2693815 A1    2/2014

OTHER PUBLICATIONS

Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.2.0, 3GPP Organizational Partners, Dec. 2013, 507 pages.

(Continued)

*Primary Examiner* — Chi H Pham
*Assistant Examiner* — Alexander O Boakye
(74) *Attorney, Agent, or Firm* — Sage Patent Group

(57) ABSTRACT

Embodiments of a node that assists in adaptation of a carrier aggregation configuration of a wireless device in a cellular communications network and methods of operation thereof are disclosed. In some embodiments, the node determines an amount of required uplink resources (Pr) for the wireless device, decides whether adaptation of a carrier aggregation configuration of the wireless device should be performed based on a comparison of the amount of required uplink resources (Pr) for the wireless device and a maximum number of uplink resources (Pc) that can be allocated for the wireless device in a current carrier aggregation configuration of the wireless device, and takes an action to cause adaptation of the carrier aggregation configuration of the wireless device upon deciding that adaptation of the carrier aggregation configuration of the wireless device should be performed.

31 Claims, 15 Drawing Sheets

(51) Int. Cl.
*H04W 28/02* (2009.01)
*H04W 72/04* (2009.01)
*H04L 5/00* (2006.01)

(58) Field of Classification Search
USPC ........................................................ 370/329
See application file for complete search history.

(56) References Cited

U.S. PATENT DOCUMENTS

| | | | |
|---|---|---|---|
| 2010/0303011 A1* | 12/2010 | Pan | H04L 5/001 370/328 |
| 2011/0199999 A1* | 8/2011 | Nakao | H04L 5/003 370/329 |
| 2014/0029586 A1 | 1/2014 | Loehr et al. | |

OTHER PUBLICATIONS

Author Unknown, "Technical Specification Group Radio Access Network; Evolved Universal Terrestrial Radio Access (E-UTRA); User Equipment (UE) radio transmission and reception (Release 8)," Technical Specification 36.101, Version 8.23.0, 3GPP Organizational Partners, Dec. 2013, 171 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.7.0, 3GPP Organizational Partners, Sep. 2013, 209 pages.

International Search Report and Written Opinion for International Patent Application No. PCT/IB2015/052071, dated Jun. 19, 2015, 11 pages.

* cited by examiner

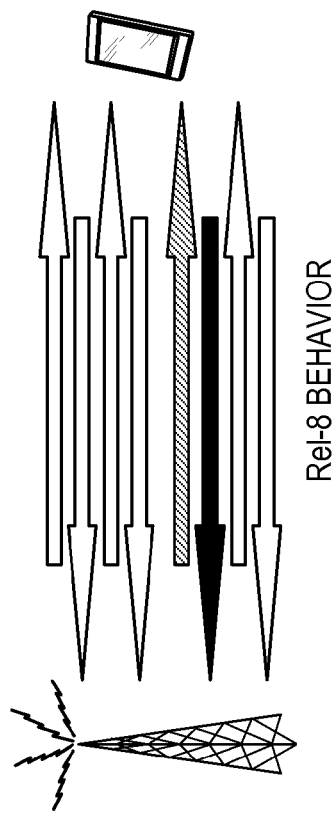
FIG. 1A Rel-8 BEHAVIOR
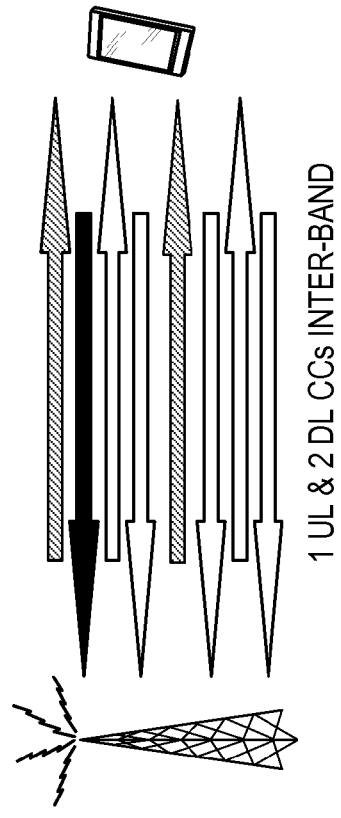
FIG. 1B 1 UL & 2 DL CCs INTER-BAND 1 UL & 3 DL CCs INTER-BAND 2 UL & 2 DL CCs INTRA-BAND

ADAPTING CARRIER AGGREGATION CONFIGURATIONS FOR USER EQUIPMENT

RELATED APPLICATIONS

This application claims the benefit of provisional patent application Ser. No. 61/968,756, filed Mar. 21, 2014, the disclosure of which is hereby incorporated herein by reference in its entirety.

TECHNICAL FIELD

The present disclosure relates to carrier aggregation in a cellular communications network.

BACKGROUND

Carrier aggregation is enabled in Third Generation Partnership Project (3GPP) Long Term Evolution (LTE) networks starting with Release 10. Carrier aggregation is where a User Equipment device (UE) receives on multiple carriers, which are referred to as component carriers, for the downlink or transmits on multiple component carriers for the uplink. Carrier aggregation is one of the ways of increasing the per-user throughput for UEs with good channel conditions with the capability of receiving and transmitting at higher data rates. A UE can be configured in two or three (or more) simultaneous bands in the downlink and/or the uplink.

FIG. 1A is a schematic diagram showing an example of a LTE Release 8 uplink from a UE to an enhanced or evolved Node B (eNB), or base station, and a downlink from the eNB to the UE on a single cell. This single cell has a single uplink carrier and a single downlink carrier. For Frequency Division Duplexing (FDD) mode, the uplink and downlink carriers are different carriers. For Time Division Duplexing (TDD) mode, the uplink and downlink carriers are the same carrier. In the example of FIG. 1A, the eNB is capable of running four different cells with respective uplink and downlink carriers at the same time. These cells are operated either in different bands or they could also be operated in the same band. In LTE Release 8, only one cell is used for communication between the eNB and the UE.

Conversely, carrier aggregation uses two or more component carriers in the downlink and/or two or more component carriers in the uplink. As such, there are many different scenarios for carrier aggregation. As a first example, Downlink (DL) Carrier Aggregation (CA) may use two downlink component carriers. This is referred to as 2 DL CA. For 2 DL CA, a single uplink carrier may be used. In this regard, FIG. 1B is a schematic diagram illustrating an example of 2 DL CA where there are two downlink component carriers and a single uplink carrier. Compared to FIG. 1A, in FIG. 1B, two of the cells are activated for the UE, which is the initial version of DL CA. In this case, the UE is configured to simultaneously receive downlink transmissions on two cells while transmitting on only one cell. The uplink allocation in this case is arbitrary, meaning that either of the cells can be used for uplink transmission. In carrier aggregation terms, the cell where the uplink is allocated for a certain UE is referred to as a Primary Cell (PCell) for that UE, while the other aggregated cell is referred to as a Secondary Cell (SCell). PCell and SCell combinations are UE specific.

FIG. 1C illustrates an example of 3 DL CA where the UE simultaneously receives on three downlink component carriers (i.e., on three cells) and transmits on, in this example, one uplink carrier (i.e., on one cell). While only one uplink cell is activated for the UE in this example, note that Uplink (UL) CA may also be used such that two or more cells may be activated for the UE for the uplink. The uplink may be allocated to any of the cells.

FIG. 1D illustrates an example of 2 UL CA where the UE simultaneously transmits on two cells for the uplink and, in this example, simultaneously receives on two cells for the downlink. Contrary to FIGS. 1B and 1C, FIG. 1D shows the case when UL CA is also enabled for the UE. In this case, only 2 UL and 2 DL CA is shown. In case of UL CA, PCell and SCell definitions are still UE specific.

Depending on the carrier frequency, or depending on the physical eNB deployment, the deployment of a carrier aggregation-enabled system can be very different. In this regard, FIGS. 2A and 2B provide two examples of a carrier aggregation deployment. FIG. 2A illustrates a deployment including a first set of cells on a first carrier frequency (F1) and a second set of cells on a second carrier frequency (F2). The F1 and F2 cells are co-located and overlaid, but the F2 cells have smaller coverage due to larger path loss. The F1 cells provide sufficient coverage, and the F2 cells are used to improve throughput. Mobility is performed based on the coverage of the F1 cells. One possible scenario to consider is when F1 and F2 are of different bands, e.g., F1={800 megahertz (MHz), 2 gigahertz (GHz)} and F2={3.5 GHz}, etc. It is expected that aggregation is possible between overlaid F1 and F2 cells.

FIG. 2B illustrates a different deployment in which the F1 cells provide macro coverage and the F2 cells are provided by Remote Radio Heads (RRHs) to improve throughput at hot spots. Mobility is performed based on the coverage of the F1 cells. A possible scenario is when F1 and F2 are of different bands, e.g., F1={800 MHz, 2 GHz} and F2={3.5 GHz}, etc. It is expected that the F2 RRH cells can be aggregated with the underlying F1 macro cells.

In LTE, the nominal number of Resource Blocks (RBs) is 6, 15, 25, 50, 75, and 100 RBs for channel bandwidths of 1.4 MHz, 3 MHz, 5 MHz, 10 MHz, 15 MHz, and 20 MHz, respectively, as shown in Table 1 below. The maximum limit on the uplink configurations in terms of allowed RBs, however, is pre-defined in the standard for different bands and carrier aggregation configurations to ensure that the UE meets one or more pre-defined receiver requirements, e.g. UE receiver sensitivity (aka REFSENS). The requirements on uplink configuration also depend upon channel bandwidth.

More specifically, the uplink configurations specified for different bands and different carrier aggregation configurations determine the uplink transmission block size in terms of RBs when a certain carrier aggregation configuration is used or when a single uplink is used. Three representative tables from 3GPP Technical Specification (TS) 36.101 (version 12.2.0) are presented below and show allowed uplink configurations when single uplink transmission, or inter-band carrier aggregation or intra-band non-contiguous carrier aggregation, respectively, is used. It is observed from Tables 1 through 4 that for certain bands, CA configuration and Bandwidth (BW) or BW combinations aka aggregated BW (e.g., Table 3 or 4) allowed in certain CA configurations (e.g. Table 3 or 4), the uplink configuration (i.e., maximum allowed uplink RBs) is reduced compared to the corresponding nominal values (i.e., in Table 1).

TABLE 1

Transmission bandwidth configuration $N_{RB}$ in E-UTRA channel bandwidths for both UL and DL

| | Channel bandwidth $W_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

Uplink configuration for reference sensitivity
E-UTRA Band/Channel bandwidth/$N_{RB}$/Duplex mode

| E-UTRA Band | 1.4 MHz | 3 MHz | 5 MHz | 10 MHz | 15 MHz | 20 MHz | Duplex Mode |
|---|---|---|---|---|---|---|---|
| 1 | | | 25 | 50 | 75 | 100 | FDD |
| 2 | 6 | 15 | 25 | 50 | 50[1] | 50[1] | FDD |
| 3 | 6 | 15 | 25 | 50 | 50[1] | 50[1] | FDD |
| 4 | 6 | 15 | 25 | 50 | 75 | 100 | FDD |
| 5 | 6 | 15 | 25 | 25[1] | | | FDD |
| 6 | | | 25 | 25[1] | | | FDD |
| 7 | | | 25 | 50 | 75 | 75[1] | FDD |
| 8 | 6 | 15 | 25 | 25[1] | | | FDD |
| 9 | | | 25 | 50 | 50[1] | 50[1] | FDD |
| 10 | | | 25 | 50 | 75 | 100 | FDD |
| 11 | | | 25 | 25[1] | | | FDD |
| 12 | 6 | 15 | 20[1] | 20[1] | | | FDD |
| 13 | | | 20[1] | 20[1] | | | FDD |
| 14 | | | 15[1] | 15[1] | | | FDD |
| ... | | | | | | | |
| 17 | | | 20[1] | 20[1] | | | FDD |
| 18 | | | 25 | 25[1] | 25[1] | | FDD |
| 19 | | | 25 | 25[1] | 25[1] | | FDD |
| 20 | | | 25 | 20[1] | 20[3] | 20[3] | FDD |
| 21 | | | 25 | 25[1] | 25[1] | | FDD |
| 22 | | | 25 | 50 | 50[1] | 50[1] | FDD |
| 23 | 6 | 15 | 25 | 50 | 75 | 100 | FDD |
| 24 | | | 25 | 50 | | | FDD |
| 25 | 6 | 15 | 25 | 50 | 50[1] | 50[1] | FDD |
| 26 | 6 | 15 | 25 | 25[1] | 25[1] | | FDD |
| 27 | 6 | 15 | 25 | 25[1] | | | FDD |
| 28 | | 15 | 25 | 25[1] | 25[1] | 25[1] | FDD |
| 30 | | | 25 | 25[1] | | | FDD |
| 31 | 6 | 5[4] | 5[4] | | | | FDD |
| ... | | | | | | | |
| 33 | | | 25 | 50 | 75 | 100 | TDD |
| 34 | | | 25 | 50 | 75 | | TDD |
| 35 | 6 | 15 | 25 | 50 | 75 | 100 | TDD |
| 36 | 6 | 15 | 25 | 50 | 75 | 100 | TDD |
| 37 | | | 25 | 50 | 75 | 100 | TDD |
| 38 | | | 25 | 50 | 75 | 100 | TDD |
| 39 | | | 25 | 50 | 75 | 100 | TDD |
| 40 | | | 25 | 50 | 75 | 100 | TDD |
| 41 | | | 25 | 50 | 75 | 100 | TDD |
| 42 | | | 25 | 50 | 75 | 100 | TDD |
| 43 | | | 25 | 50 | 75 | 100 | TDD |
| 44 | | 15 | 25 | 50 | 75 | 100 | TDD |

NOTE 1:
[1]refers to the UL resource blocks shall be located as close as possible to the downlink operating band but confined within the transmission bandwidth configuration for the channel bandwidth (Table 5.6-1).
NOTE 2:
For the UE which supports both Band 11 and Band 21 the uplink configuration for reference sensitivity is FFS.
NOTE 3:
[3]refers to Band 20; in the case of 15 MHz channel bandwidth, the UL resource blocks shall be located at $RB_{start}$ 11 and in the case of 20 MHz channel bandwidth, the UL resource blocks shall be located at $RB_{start}$ 16
NOTE 4:
[4]refers to Band 31; in the case of 3 MHz channel bandwidth, the UL resource blocks shall be located at $RB_{start}$ 9 and in the case of 5 MHz channel bandwidth, the UL resource blocks shall be located at $RB_{start}$ 10.

TABLE 3

Uplink configuration for reference sensitivity
E-UTRA Band/Channel bandwidth/$N_{RB}$/Duplex mode

| EUTRA CA Configuration | EUTRA band | 1.4 MHz (dBm) | 3 MHz (dBm) | 5 MHz (dBm) | 10 MHz (dBm) | 15 MHz (dBm) | 20 MHz (dBm) | Duplex mode |
|---|---|---|---|---|---|---|---|---|
| CA_2A-29A | 2 | | | 25 | 50 | | | FDD |
| | 29 | N/A | N/A | N/A | | | | |
| CA_4A-29A | 4 | | | 25 | 50 | | | FDD |
| | 29 | N/A | N/A | N/A | | | | |
| CA_23A-29A | 23 | | | 25 | 50 | 75 | 100 | FDD |
| | 29 | N/A | N/A | N/A | | | | |

TABLE 4

Intra-band non-contiguous CA uplink configuration for reference sensitivity

| CA configuration | Aggregated channel bandwidth (PCC + SCC) | $W_{gap}$/[MHz] | UL PCC Allocation | $\Delta R_{IBNC}$ (dB) | Duplex mode |
|---|---|---|---|---|---|
| CA_3A-3A | 25RB + 25RB | $45.0 < W_{gap} \leq 65.0$ | $12^1$ | 4.7 | FDD |
| | | $0.0 < W_{gap} \leq 45.0$ | $25^1$ | 0 | |
| | 25RB + 50RB | $40.0 < W_{gap} \leq 60.0$ | $12^1$ | 3.8 | |
| | | $0.0 < W_{gap} \leq 40.0$ | $25^1$ | 0 | |
| | 25RB + 75RB | $35.0 < W_{gap} \leq 55.0$ | $12^1$ | 3.6 | |
| | | $0.0 < W_{gap} \leq 35.0$ | $25^1$ | 0 | |
| | 25RB + 100RB | $30.0 < W_{gap} \leq 50.0$ | $12^1$ | 3.4 | |
| | | $0.0 < W_{gap} \leq 30.0$ | $25^1$ | 0 | |
| | 50RB + 25RB | $30.0 < W_{gap} \leq 60.0$ | $12^9$ | 5.1 | |
| | | $0.0 < W_{gap} \leq 30.0$ | $32^1$ | 0 | |
| | 50RB + 50RB | $25.0 < W_{gap} \leq 55.0$ | $12^9$ | 4.3 | |
| | | $0.0 < W_{gap} \leq 25.0$ | $32^1$ | 0 | |
| | 50RB + 75RB | $20.0 < W_{gap} \leq 50.0$ | $12^9$ | 3.8 | |
| | | $0.0 < W_{gap} \leq 20.0$ | $32^1$ | 0 | |
| | 50RB + 100RB | $15.0 < W_{gap} \leq 45.0$ | $12^9$ | 3.4 | |
| | | $0.0 < W_{gap} \leq 15.0$ | $32^1$ | 0 | |
| | 75RB + 25RB | $25.0 < W_{gap} \leq 55.0$ | $12^{10}$ | 6.0 | |
| | | $0.0 < W_{gap} \leq 25.0$ | $32^1$ | 0 | |
| | 75RB + 50RB | $20.0 < W_{gap} \leq 50.0$ | $12^{10}$ | 4.7 | |
| | | $0.0 < W_{gap} \leq 20.0$ | $32^1$ | 0 | |
| | 75RB + 75RB | $15.0 < W_{gap} \leq 45.0$ | $12^{10}$ | 4.2 | |
| | | $0.0 < W_{gap} \leq 15.0$ | $32^1$ | 0 | |
| | 75RB + 100RB | $10.0 < W_{gap} \leq 40.0$ | $12^{10}$ | 3.8 | |
| | | $0.0 < W_{gap} \leq 10.0$ | $32^1$ | 0 | |
| | 100RB + 25RB | $15.0 < W_{gap} \leq 50.0$ | $16^{11}$ | 6.5 | |
| | | $0.0 < W_{gap} \leq 15.0$ | $32^1$ | 0 | |
| | 100RB + 50RB | $10.0 < W_{gap} \leq 45.0$ | $16^{11}$ | 5.1 | |
| | | $0.0 < W_{gap} \leq 10.0$ | $32^1$ | 0 | |
| | 100RB + 75RB | $5.0 < W_{gap} \leq 40.0$ | $16^{11}$ | 4.5 | |
| | | $0.0 < W_{gap} \leq 5.0$ | $32^1$ | 0 | |
| | 100RB + 100RB | $0.0 < W_{gap} \leq 35.0$ | $16^{11}$ | 4.1 | |
| CA_4A-4A | NOTE 6 | NOTE 7 | NOTE 8 | 0.0 | FDD |
| CA_7A_7A | 50RB + 50RB | $25.0 < W_{gap} \leq 50.0$ | $32^1$ | 0.0 | FDD |
| | | $0.0 < W_{gap} \leq 25.0$ | $50^1$ | 0.0 | |
| | 75RB + 25RB | $20.0 < W_{gap} \leq 50.0$ | $32^1$ | 0.0 | |
| | | $0.0 < W_{gap} \leq 20.0$ | $50^1$ | 0.0 | |
| | 75RB + 50RB | $20.0 < W_{gap} \leq 45.0$ | $32^1$ | 0.0 | |
| | | $0.0 < W_{gap} \leq 20.0$ | $50^1$ | 0.0 | |
| | 75RB + 75RB | $15.0 < W_{gap} \leq 40.0$ | $32^1$ | 0.0 | |
| | | $0.0 < W_{gap} \leq 15.0$ | $50^1$ | 0.0 | |
| | 100RB + 75RB | $15.0 < W_{gap} \leq 35.0$ | $36^1$ | 0.0 | |
| | | $0.0 < W_{gap} \leq 15.0$ | $50^1$ | 0.0 | |
| | 100RB + 100RB | $15.0 < W_{gap} \leq 30.0$ | $32^1$ | 0.0 | |
| | | $0.0 < W_{gap} \leq 15.0$ | $45^1$ | 0.0 | |
| CA_23A-23A | NOTE 6 | NOTE 7 | NOTE 8 | 0.0 | FDD |
| CA_25A-25A | 25RB + 25RB | $30.0 < W_{gap} \leq 55.0$ | $10^1$ | 5.0 | FDD |
| | | $0.0 < W_{gap} \leq 30.0$ | $25^1$ | 0.0 | |
| | 25RB + 50RB | $25.0 < W_{gap} \leq 50.0$ | $10^1$ | 4.5 | |
| | | $0.0 < W_{gap} \leq 25.0$ | $25^1$ | 0.0 | |
| | 50RB + 25RB | $15.0 < W_{gap} \leq 50.0$ | $10^4$ | 5.5 | |
| | | $0.0 < W_{gap} \leq 15.0$ | $32^1$ | 0.0 | |

TABLE 4-continued

Intra-band non-contiguous CA uplink configuration for reference sensitivity

| CA configuration | Aggregated channel bandwidth (PCC + SCC) | $W_{gap}$/[MHz] | UL PCC Allocation | $\Delta R_{IBNC}$ (dB) | Duplex mode |
|---|---|---|---|---|---|
| | 50RB + 50RB | $10.0 < W_{gap} \le 45.0$ | $10^4$ | 5.0 | |
| | | $0.0 < W_{gap} \le 10.0$ | $32^1$ | 0.0 | |
| CA_41A-41A | NOTE 6 | NOTE 7 | NOTE 8 | 0.0 | TDD |

NOTE 1:
[1]refers to the UL resource blocks shall be located as close as possible to the downlink operating band but confined within the transmission.
NOTE 2:
$W_{gap}$ is the sub-block gap between the two sub-blocks.
NOTE 3:
The carrier center frequency of PCC in the UL operating band is configured closer to the DL operating band.
NOTE 4:
[4]refers to the UL resource blocks shall be located at $RB_{start} = 33$.
NOTE 5:
For the TDD intra-band non-contiguous CA configurations, the minimum requirements apply only in synchronized operation between all component carriers.
NOTE 6:
All combinations of channel bandwidths defined in Table 5.6A. 1-3.
NOTE 7:
All applicable sub-block gap sizes.
NOTE 8:
The PCC allocation is same as Transmission bandwidth configuration $N_{RB}$ as defined in Table 5.6-1.
NOTE 9:
[9]refers to the UL resource blocks shall be located at $RB_{start} = 25$.
NOTE 10:
[10]refers to the UL resource blocks shall be located at $RB_{start} = 35$.
NOTE 11:
[11] refers to the UL resource blocks shall be located at $RB_{start} = 50$.

Maximum Power Reduction (MPR) is defined as allowed reduction to maximum output power due to higher order modulation and transmit bandwidth configuration. The general MPR formula is defined in the UE specification 3GPP TS 36.101 since Release 8 for different transmission modes, e.g. single uplink transmission, 2 UL CA transmission, etc. The UE applies the MPR based on uplink transmission parameters, e.g. modulation, uplink configuration, carrier aggregation type or configuration, etc. Additional MPR (A-MPR) is defined for certain bands which are allowed to be applied on top of MPR for certain bands. A-MPR is usually defined for specific coexistence requirements, etc. The A-MPR is signaled to the UE by the network node. Both MPR and A-MPR are used by UEs to comply with one or more radio emission requirements, e.g. out of band emission, spurious emission, or additional spurious emission requirements.

Currently, there are several types of carrier aggregation, and the different types of carrier aggregation may have different configurations in terms of number of component carriers and available uplink physical resources (e.g., uplink RBs). In certain carrier aggregation configurations (e.g., non-contiguous carrier aggregation with one uplink component carrier and especially in two or more uplink component carriers), the available uplink physical resources on one or more uplink component carriers are very low compared to the maximum number of uplink RBs. The maximum number of uplink RBs is equal to channel bandwidth. For example, as shown in Table 4, in some cases the uplink RBs can be as small as 12 RBs even though the bandwidth of the corresponding uplink component carrier can be as large as 50 RBs. This in turn may significantly degrade the UE performance in uplink, e.g., decrease uplink user throughput. However in some cases the reduction in uplink throughput may be acceptable for the UE.

As such, there is a need for systems and methods for improving performance when using carrier aggregation.

SUMMARY

Systems and method relating to adaptation of a carrier aggregation configuration of a wireless device in a cellular communications network are disclosed. Embodiments of a method of operation of a node to enable adaptation of a carrier aggregation configuration of a wireless device in a cellular communications network are disclosed. In some embodiments, the node is a network node. In other embodiments, the node is the wireless device. In some embodiments, the method of operation of the node comprises determining an amount of required uplink resources (Pr) for the wireless device, deciding whether adaptation of a carrier aggregation configuration of the wireless device should be performed based on a comparison of the amount of required uplink resources (Pr) for the wireless device and a maximum number of uplink resources (Pc) that can be allocated for the wireless device in a current carrier aggregation configuration of the wireless device, and taking an action to cause adaptation of the carrier aggregation configuration of the wireless device upon deciding that adaptation of the carrier aggregation configuration of the wireless device should be performed. In this manner, the carrier aggregation configuration can be adapted to account for different uplink resource requirements of the wireless device as well as different maximum uplink resource allocations of different carrier aggregation configurations.

In some embodiments, the adaptation of the carrier aggregation configuration of the wireless device changes the current carrier aggregation configuration of the wireless device to a new configuration, the new configuration being one of a group consisting of: a modified version of the current carrier aggregation configuration, a different carrier aggregation configuration, and a non-carrier aggregation configuration.

In some embodiments, the current carrier aggregation configuration and the new configuration use the same set of carriers.

In other embodiments, the current carrier aggregation configuration and the new configuration use different sets of carriers. In some embodiments, the different sets of carriers are in the same frequency band. In other embodiments, the different sets of carriers are in different frequency bands.

In some embodiments, deciding whether adaptation of the carrier aggregation configuration of the wireless device should be performed comprises deciding that adaptation of the carrier aggregation configuration of the wireless device should be performed if the amount of required uplink resources (Pr) for the wireless device is greater than the maximum number of uplink resources (Pc) that can be allocated for the wireless device in the current carrier aggregation configuration of the wireless device.

In some embodiments, deciding whether adaptation of the carrier aggregation configuration of the wireless device should be performed comprises deciding that adaptation of the carrier aggregation configuration of the wireless device should be performed if the amount of required uplink resources (Pr) for the wireless device is greater than a sum of the maximum number of uplink resources (Pc) that can be allocated for the wireless device in the current carrier aggregation configuration of the wireless device and a pre-defined offset.

In some embodiments, taking an action to cause adaptation of the carrier aggregation configuration of the wireless device comprises triggering adaptation of the carrier aggregation configuration of the wireless device upon deciding that adaptation of the carrier aggregation configuration of the wireless device should be performed.

In other embodiments, taking an action to cause adaptation of the carrier aggregation configuration of the wireless device comprises performing adaptation of the carrier aggregation configuration of the wireless device upon deciding that adaptation of the carrier aggregation configuration of the wireless device should be performed. Further, in some embodiments, performing adaptation of the carrier aggregation configuration of the wireless device comprises obtaining a target carrier aggregation configuration for the wireless device, and changing the carrier aggregation configuration of the wireless device to the target carrier aggregation configuration.

In some embodiments, obtaining the target carrier aggregation configuration for the wireless device comprises obtaining the target carrier aggregation configuration for the wireless device based on the amount of required uplink resources (Pr) for the wireless device and pre-defined data for a plurality of potential carrier aggregation configurations for the wireless device. Further, in some embodiments, the pre-defined data comprises values for a maximum number of uplink resources (Pc) that can be allocated for the wireless device in each of the plurality of potential carrier aggregation configurations for the wireless device.

In some embodiments, the node is a network node, and obtaining the target carrier aggregation configuration for the wireless device comprises requesting one or more preferred carrier aggregation configurations from the wireless device, receiving one or more preferred carrier aggregation configurations from the wireless device in response to the request, and selecting the target carrier aggregation configuration for the wireless device from the one or more preferred carrier aggregation configurations received from the wireless device.

In some embodiments, performing adaptation of the carrier aggregation configuration of the wireless device comprises selecting one of a new carrier aggregation configuration and a non-carrier aggregation configuration as the new configuration of the wireless device based on which of the new carrier aggregation configuration and the non-carrier aggregation configuration has a maximum uplink allocation that is greater than or equal to the amount of required uplink resources (Pr) of the wireless device.

In some embodiments, performing adaptation of the carrier aggregation configuration of the wireless device comprises selecting one of a new carrier aggregation configuration having a maximum uplink allocation that is greater than or equal to the amount of required uplink resources (Pr) and a non-carrier aggregation configuration that has a maximum uplink allocation that is greater than or equal to the amount of required uplink resources (Pr) as the new configuration of the wireless device. In some embodiments, the one of the new carrier aggregation configuration and the non-carrier aggregation configuration selected as the new configuration of the wireless device is the one of the new carrier aggregation configuration and the non-carrier aggregation configuration having the greater maximum uplink allocation.

In some embodiments, the one of the new carrier aggregation configuration and the non-carrier aggregation configuration selected as the new configuration of the wireless device is always the non-carrier aggregation configuration.

In some embodiments, the one of the new carrier aggregation configuration and the non-carrier aggregation configuration selected as the new configuration of the wireless device is always the second carrier aggregation configuration provided that the current carrier aggregation configuration and the second carrier aggregation configuration are in the same frequency band.

In some embodiments, performing adaptation of the carrier aggregation configuration of the wireless device comprising changing the carrier aggregation configuration of the wireless device from the current carrier aggregation configuration of the wireless device to a new carrier aggregation configuration, wherein the current carrier aggregation configuration is an intra-band non-contiguous carrier aggregation configuration with M carriers, the new carrier aggregation configuration is an intra-band non-contiguous carrier aggregation configuration with N carriers, and N<M.

In some embodiments, performing adaptation of the carrier aggregation configuration of the wireless device comprises changing the carrier aggregation configuration of the wireless device from the current carrier aggregation configuration of the wireless device to a new carrier aggregation configuration, wherein the current carrier aggregation configuration is an intra-band non-contiguous carrier aggregation configuration with X frequency gaps, the new carrier aggregation configuration is an intra-band non-contiguous carrier aggregation configuration with Y frequency gaps, and Y<X.

In some embodiments, performing adaptation of the carrier aggregation configuration of the wireless device comprises changing the carrier aggregation configuration of the wireless device from the current carrier aggregation configuration of the wireless device to a new carrier aggregation configuration, wherein the current carrier aggregation configuration is an intra-band non-contiguous carrier aggregation configuration and the new carrier aggregation configuration is an intra-band contiguous carrier aggregation configuration. In some embodiments, a set of carriers for the current carrier aggregation configuration and a set of carriers for the new carrier aggregation configuration are in the same frequency band.

In some embodiments, performing adaptation of the carrier aggregation configuration of the wireless device comprises changing the carrier aggregation configuration of the wireless device from the current carrier aggregation configuration of the wireless device to a new carrier aggregation configuration, wherein the current carrier aggregation configuration is an intra-band non-contiguous carrier aggregation configuration and the new carrier aggregation configuration is an inter-band contiguous carrier aggregation configuration.

In some embodiments, determining the amount of required uplink resources (Pr) for the wireless device comprises determining the amount of required uplink resources (Pr) for the wireless device based on an amount of traffic in an uplink buffer or expected data rate of the wireless device.

In some embodiments, determining the amount of required uplink resources (Pr) for the wireless device comprises determining the amount of required uplink resources (Pr) for the wireless device based on a type of uplink service required by the wireless device.

In some embodiments, determining the amount of required uplink resources (Pr) for the wireless device comprises determining the amount of required uplink resources (Pr) for the wireless device based on a data rate of the wireless device logged or measured over a certain time period.

In some embodiments, the cellular communications network is a Long Term Evolution (LTE) network, and the uplink resources are resource blocks.

In some embodiments, the node is a network node of the cellular communications network.

In some embodiments, the node is the wireless device.

Embodiments of a node operative to enable adaptation of a carrier aggregation configuration of a wireless device in a cellular communications network are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A through 1D illustrate different non-carrier aggregation (non-CA) and Carrier Aggregation (CA) configurations;

DETAILED DESCRIPTION

Figure 1C:
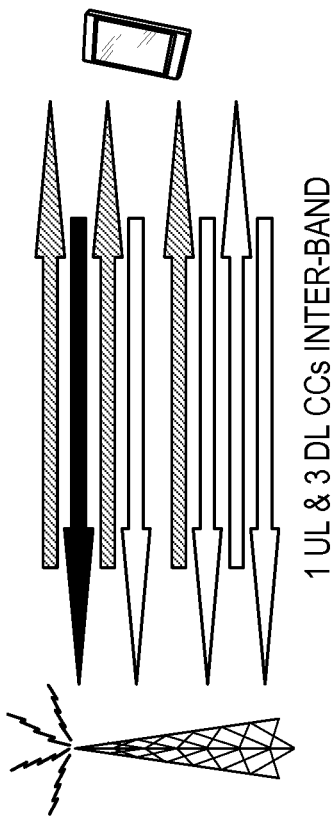
Figure 1D:
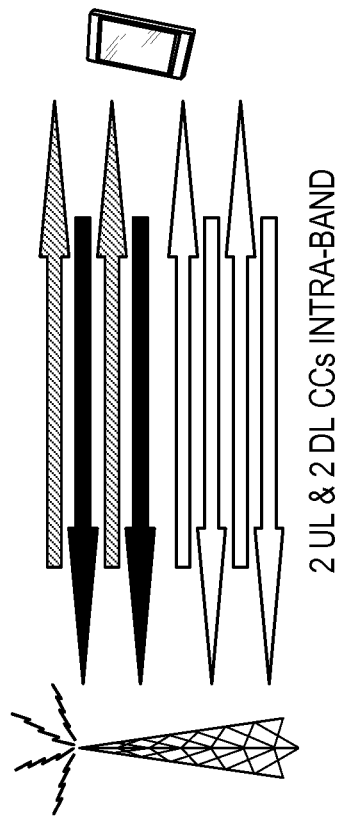
Figure 2A:
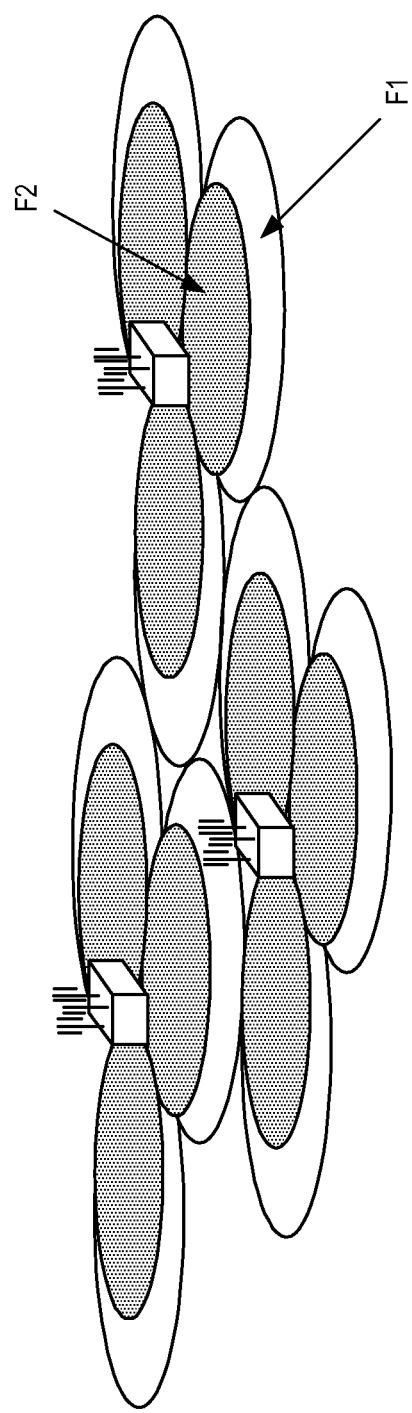
FIGS. 2A and 2B illustrate two exemplary CA deployments.
Figure 2B:
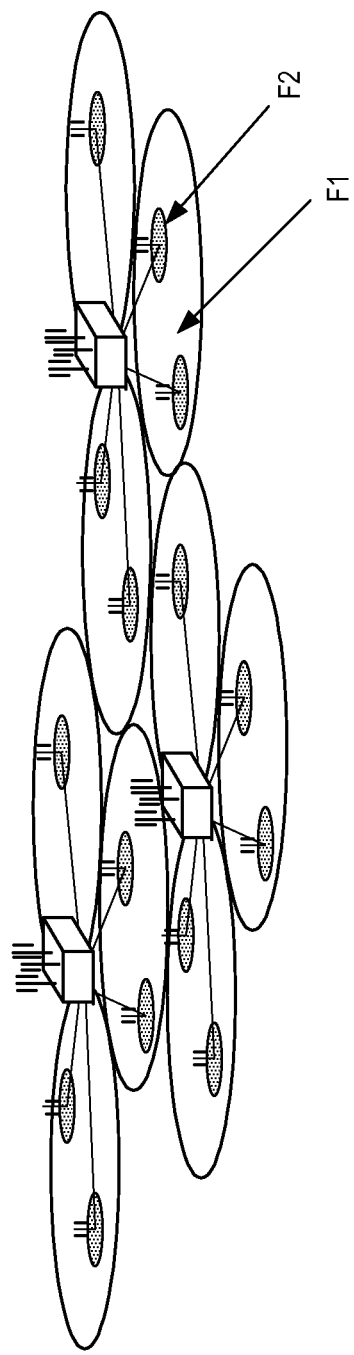

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

At the outset, the following terms are used throughout the disclosure:

First Carrier Aggregation (CA) configuration: current configuration with Uplink (UL) bandwidth allocation (K) below threshold (H1), e.g. Non-Contiguous CA (NC-CA);

Second CA configuration: possible new configuration with UL bandwidth allocation (L) above H1. Examples of the second CA configurations are intra-band contiguous CA, inter-band CA, or NC-CA with fewer gaps than in first CA configuration; and Non-CA configuration: possible new configuration with UL bandwidth allocation (M) above H1; where L may or may not be larger than M because they may be in different bands and may also be related to different bandwidths.

Notably, as used herein, the term "bandwidth" refers to the actual channel bandwidth of carrier (e.g., 1.4 megahertz (MHz) or 6 Resource Blocks (RBs), 3 MHz or 15 RBs, 5 MHz or 25 RBs, etc. for Third Generation Partnership Project (3GPP) Long Term Evolution (LTE)). The "bandwidth" of an uplink carrier defines what is referred to herein as more generally as the "maximum number of uplink channels" or the "maximum number of uplink physical channels" or more specifically the "maximum number of uplink resource blocks" or "maximum bandwidth" for that uplink carrier. Conversely, as used herein, an "uplink bandwidth allocation" is the portion of the bandwidth of an uplink carrier(s) that can be allocated for uplink transmission. The "uplink bandwidth allocation" may also be referred to herein as a maximum number of allowed RBs for the uplink carrier(s), maximum allowable bandwidth for the uplink carrier(s), or (maximum) available uplink resources for the uplink carrier(s). As discussed above in the background, different carrier aggregation configurations can have different uplink bandwidth allocations even for the same bandwidth uplink carrier(s).

In some embodiments, the non-limiting term User Equipment device (UE) is used. The UE herein can be any type of wireless device capable of communicating with a network node or another UE over radio signals. The UE may be a radio communication device, a target device, a Device-to-Device (D2D) UE, a machine type UE, or a UE capable of Machine-to-Machine communication (M2M), a sensor equipped UE, an iPAD, a tablet, mobile terminals, a smart phone, Laptop Embedded Equipment (LEE), Laptop Mounted Equipment (LME), Universal Serial Bus (USB) dongles, Customer Premises Equipment (CPE), etc. A UE may include the hardware and software components for transmitting, receiving, and processing signals that it receives wirelessly. Such components include, but are not limited to, one or more antennas, a transmitter, a receiver (or transceiver), a hardware processor that includes circuitry for executing instructions, memory for storing instructions and software modules, etc.

The generic term "radio network node" or "network node" or simply, "node" is used. A node can be any kind of network node, including a base station, a radio base station, a base transceiver station, a base station controller, a network controller, an enhanced or evolved Node B (eNB), a Node B, a relay node, an access point, a radio access point, a Remote Radio Unit (RRU), a Remote Radio Head (RRH), etc. The node may be part of a LTE network, a LTE-Advanced (LTE-A) network, or a network of another radio access technology. Notably, as used herein, LTE can refer to LTE or LTE-A, as appropriate depending on the context. In some embodiments, cell change of the UE is done by a node or by the UE itself.

The generic term cell change or cell change of UE is used. Examples of cell change are handover, Radio Resource Control (RRC) connection re-establishment, RRC connection release with redirection, Primary Cell (PCell) change in CA, Primary Component Carrier (PCC) change in CA, Secondary Cell (SCell) change in CA, Secondary Component Carrier (SCC) change in CA, swapping between PCC and SCC, etc. In idle or low activity RRC state, an example of cell change is cell selection, cell reselection, etc., which are autonomously performed by the UE.

The term "determining" is used and it may also be obtaining, receiving, detecting, identifying, etc.

The embodiments are described by considering LTE; however, the embodiments are applicable to any Radio Access Technology (RAT) or multi-RAT systems, where the UE receives and/or transmit signals (e.g., data), e.g. LTE Frequency Division Duplexing (FDD)/Time Division Duplexing (TDD), Wideband Code Division Multiple Access (WCDMA)/High Speed Packet Access (HSPA), Global System for Mobile Communications (GSM)/GSM Enhanced Data Rates for GSM Evolution Radio Access Network (GERAN), WiFi, WLAN, CDMA2000 etc.

The following embodiments can be applied to any of the CA cases mentioned in FIGS. 1A-1D and beyond. In another words, regardless of number of Component Carriers (CCs) in downlink, as long as only one UL CC is configured, then the embodiments directly apply. For the case of more than one UL CC (e.g., 2 UL CCs and higher), however, the embodiments can be applied also unless otherwise mentioned.

Currently, there is no mechanism to enhance the UE uplink performance when the UE is configured with a CA configuration with (reduced) uplink RBs below a threshold. In the existing solutions, the UE uplink transmission rate or capacity can be limited when the UE is configured with a certain type of CA (e.g., intra-band NC-CA) and specifically with certain CA configuration in terms of maximum allowed uplink RBs. The limit on the maximum allowed uplink RBs will degrade the UL performance of the UE and especially services that require higher UL data rates (e.g. video streaming). Embodiments of the present disclosure solve this problem and enhance the UL data rate of the UE configured with such CA configuration.

In this disclosure, embodiments are described for determining suitable CA configuration(s) to be used by the UE based on a required uplink resource usage of the UE, and changing or adapting a current CA configuration of the UE to a target configuration (i.e., another CA configuration or single carrier configuration), thereby enabling the UE to meet its uplink resource requirement (e.g., required number of uplink RBs). The required uplink resource can be determined based on one or more criteria including, among others: uplink buffer status, user service type, user bit rate requirements, long term uplink data rate or buffer statistics, etc. The CA configurations can also be adapted to the target configuration based on one or more additional criteria, such as uplink transmission characteristics, e.g., Maximum Power Reduction (MPR), Additional MPR (A-MPR), etc.

Embodiments of a method of adapting a CA configuration of a UE can be implemented by a network node based on network node implementation or by a UE autonomously based on a pre-defined rule (e.g., a rule specified in a standard such as a 3GPP LTE standard) and information received from the network node.

As an example, steps performed in a first node managing CA configuration used by a second node include:
  Obtaining information about a first CA configuration used by the second node, e.g. information stored in the first node,
  Obtaining information about the required uplink resource usage by the second node,
  Comparing the obtained required uplink resource usage information with the available uplink resources in the first CA configuration (i.e., currently used CA configuration) by the second node, e.g., based on pre-defined information of available uplink resources, and
  Adapting the CA configuration of the UE to another configuration (e.g., a second CA configuration or to a single carrier configuration) to ensure that the said required number of uplink resources are available for the second node (e.g., the UE).

The above steps may thus be configured and implemented according to different optional embodiments to accomplish various features and benefits, to be further described below.

As discussed below in detail, embodiments disclosed herein generally include:
  Embodiments of a method in either a node or a UE of triggering adaptation of CA configuration based on required uplink resources, Embodiments of a method in either a node or a UE of performing adaptation of CA configuration based on required uplink resources, and Embodiments of a method in a first node of configuring UE for adaptation of CA configuration based on required uplink resources.

Notably, while the embodiments described below focus on a network node (e.g., a base station) and a wireless device (e.g., a UE), the systems and methods described herein can be applied to any first node and second node in a wireless communications system that utilizes CA and in which a CA configuration of the wireless device is desirable to be adapted according to the embodiments described herein.

Figure 3:
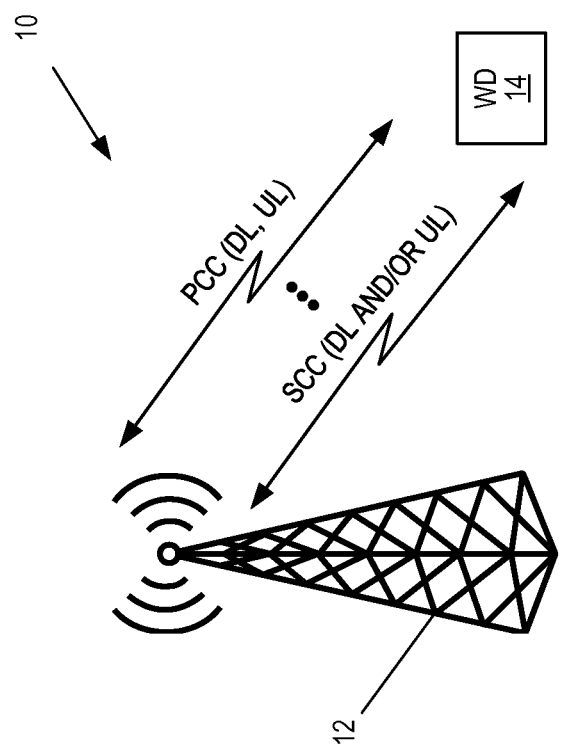
FIG. 3 illustrates one example of a cellular communications network in which CA configuration adaptation is provided according to some embodiments of the present disclosure.

Before describing embodiments of the present disclosure, a discussion of one example of a cellular communications network 10 enabling CA is beneficial. As illustrated in FIG. 3, the cellular communications network 10 includes a base station 12 (e.g., an eNB in LTE) and a wireless device 14 (e.g., a UE). In this example, the base station 12 controls a number of cells. Using CA, the wireless device 14 can be configured with a PCell on a PCC for both downlink and uplink and one or more SCells on respective SCCs for downlink and/or uplink. Thus, for example, the wireless device 14 may be configured to 2 Downlink (DL) CCs for downlink CA and a single uplink CC (i.e., a PCC for the uplink). As another example, the wireless device 14 may be configured with 2 DL CCs for downlink CA and 2 UL CCs for uplink CA. As discussed above, various different CA configurations are possible using various different frequency bands and frequency band combinations.

As also discussed above, some CA configurations for some frequency bands or frequency band combinations have maximum uplink allocations (e.g., maximum allowed uplink RBs) that are substantially less than the respective channel bandwidths. This may lead to less than ideal performance, particularly when the uplink resource requirements of the wireless device 14 are greater than the maximum uplink allocation for its current CA configuration. As such, systems and methods are disclosed for adapting the CA configuration of the wireless device 14 to provide improved performance.

Figure 4:
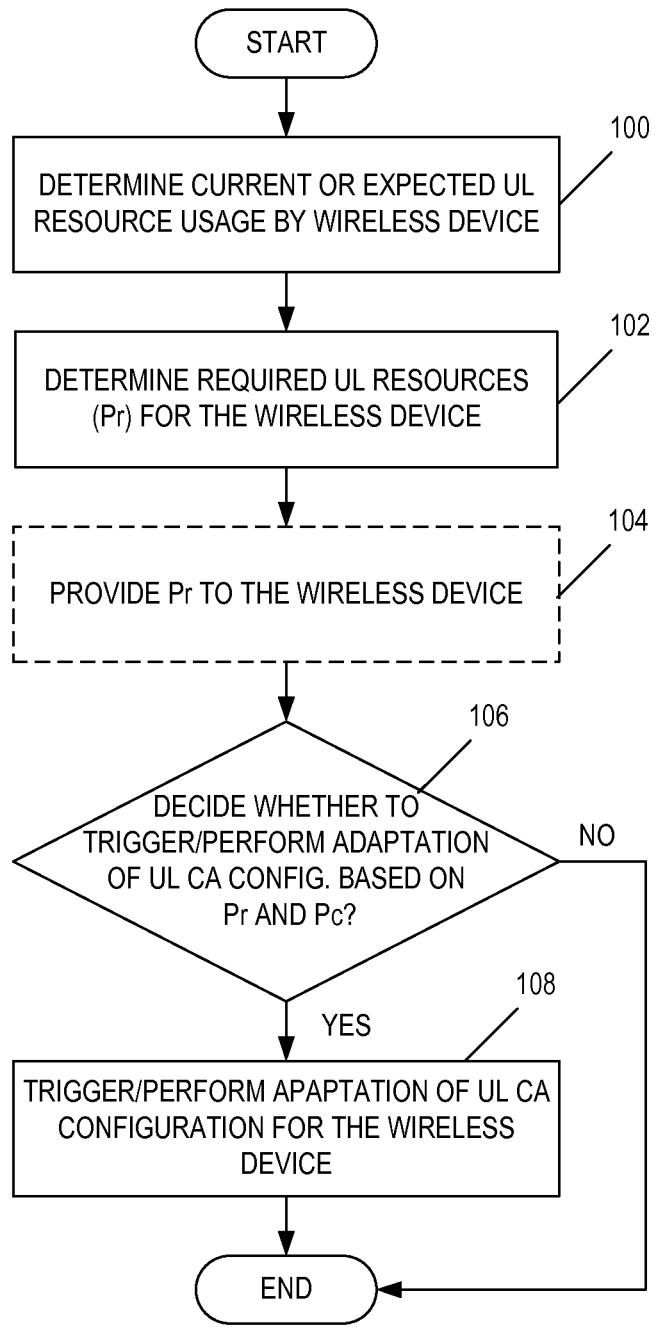
FIG. 4 is a flow chart that illustrates the operation of a network node to trigger or perform adaptation of a CA configuration of a wireless device according to some embodiments of the present disclosure.
Figure 5:
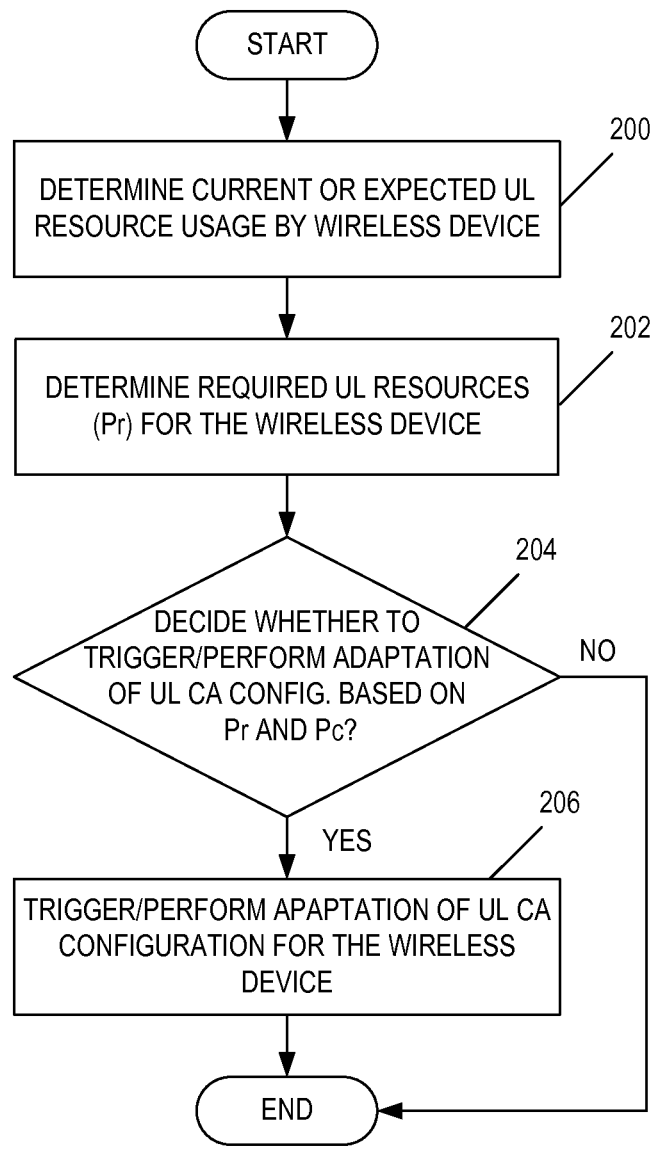
FIG. 5 is a flow chart that illustrates the operation of a wireless device to trigger or perform adaptation of a CA configuration of the wireless device according to some embodiments of the present disclosure.

In this regard, FIG. 4 is a flow chart that illustrates the operation of a network node (e.g., the base station 12) to take an action to effect adaptation of a CA configuration of a UE (e.g., the wireless device 14) based on required uplink resources of the UE according to some embodiments of the present disclosure. The action is either triggering adaptation of the CA configuration of the UE or performing adaptation of a CA configuration of a UE, depending on the embodiment. Similarly, FIG. 5 is a flow chart that illustrates the operation of a UE (e.g., the wireless device 14) to take an action to effect adaptation of the CA configuration of the UE (e.g., trigger or perform adaptation of a CA configuration of the UE) based on required uplink resources of the UE according to some other embodiments of the present disclosure. In general, in both FIG. 4 and FIG. 5, the node performing the process (i.e., the network node serving or managing adaptation of the CA configuration of the UE or the UE itself) generally performs the following steps:

Determining or obtaining current or expected uplink resource usage,

Determining or obtaining required uplink resources,

Comparing between required and current uplink resource usage of the UE.

More specifically, as illustrated in FIG. 4, the network node determines a current or expected uplink resource usage by the wireless device (step 100). In this step, the network node determines a current or expected uplink resource usage by the UE. The uplink resource usage can be determined based on one or more of the following:

Uplink rate based on measurement, e.g., average uplink bit rate obtained or logged over the last certain time period, Uplink rate based on statistics or historical data related to previous uplink transmissions, Explicit indication received by the network node from the UE, e.g., UE report on status of its buffer size, expected data rate, etc.

Implicit determination based on downlink data rate. Downlink transmission also requires a certain amount of uplink resources depending upon service. For example, the network node or the UE may determine that the expected uplink data rate is 10-15% of the downlink data rate if it is best effort. Conversely, if the downlink data rate is voice over Internet Protocol (IP), then the downlink data rate is the same as the uplink data rate.

The network node determines an amount or number of physical uplink resources required for the UE, which is referred to as (amount of) required uplink resources (Pr) for the UE, based on the determined current or expected uplink resource usage by the UE (step 102). More specifically, the network node translates or maps the determined current or expected uplink resources into the required uplink resources (Pr). The network node may map the determined current or expected uplink resource usage of step 100 (e.g., a determined data rate) into the required uplink resources (Pr). Examples of physical resources are RBs, resource elements, virtual RBs, physical RBs, etc. The mapping can be based on, for example, pre-defined tables that also take into account the Modulation and Coding Scheme (MCS) used for transmission, etc. For example, the network node may determine that in order to achieve up to 1 megabits per second (Mbps) in the uplink, the network node has to allocate up to at least 25 RBs to the UE in uplink.

Optionally, in some embodiments, the network node signals the amount of required uplink resources (Pr) determined in step 102 to the UE (step 104). This may be beneficial where the UE itself performs cell change, e.g., cell reselection in idle state. In other embodiments, the network node provides the value of Pr to the UE, and the UE then uses the value of Pr to determine whether to trigger adaptation of the CA configuration of the UE (according to the teachings of FIG. 5 below).

The network node determines whether to trigger or perform (depending on the embodiment) adaptation of the CA configuration of the UE based on the amount of required uplink resources (Pr) required by the UE and a maximum number of uplink resources (Pc) of the current CA configuration of the UE (step 106). In some embodiments, the network node compares the amount of required uplink resources (Pr) with the maximum number of uplink resources (Pc) of the current CA configuration of the UE. The maximum number of uplink resources (Pc) is the maximum number of uplink physical resources that can be allocated for the operating carrier(s) of the UE. For example, if the UE is operating on band 3 with NC-CA mode (e.g., 20 MHz+20 MHz channel bandwidth), then the maximum RBs are limited to 16 RBs for certain Wgaps between the CCs, i.e. Pc=16 RBs. The network node can determine the maximum number of uplink resources (Pc) based on the pre-defined information associated with the current CA configuration of the UE. The network node may compare the amount of required uplink resources (Pr) with the maximum number of uplink resources (Pc) for the UE in case the UE is operating in CA, i.e., if the UE is configured with a PCC and at least one SCC. In this case, the network node may compare the amount of required uplink resources (Pr) with the maximum number of uplink resources (Pc) for at least the PCC.

Examples of generalized comparison functions that can be used by the network node are as follows:

$$Y1=f(Pr,Pc) \quad (1)$$

$$Y2=f(Pr,Pc,h) \quad (2)$$

where h is a resource offset parameter that may, for example, be pre-defined or configured by the network (e.g., by the network node). Further, the value for h may, in some embodiments, depend upon Pr or Pc. The network node can use any of the above functions to decide whether there is a need to perform adaptation of the CA configuration of the UE due to lack of uplink physical resources within the current CA configuration of the UE. This can be explained with specific examples. As a first example, using Equation (1) above, the function f(Pr, Pc) may be defined such that the network node decides that adaptation of the CA configuration of the UE should be performed if Pr>Pc. In another example, using Equation (2) above, the function f(Pr, Pc, h) may be defined such that the network node decides that adaptation of the CA configuration of the UE should be performed if Pr>(Pc+h).

If the network node determines that adaptation of the CA configuration of the UE should not be performed, the process ends. Otherwise, if the network node determines that adaptation of the CA configuration of the UE should be performed, the network node triggers or performs adaptation of the CA configuration of, or for, the UE (step 108). Notably, as used herein, the term "causing" adaptation of the CA configuration of the UE is a general term that encompasses both triggering adaptation of the CA configuration of the UE and performing adaptation of the CA configuration of the UE.

With respect to triggering adaptation of the CA configuration of the UE, the network node triggers adaptation of the CA configuration of the UE by, in some embodiments, the UE itself. More specifically, in some embodiments, the network node transmits a message or other signaling to the UE indicating to the UE that the UE should adapt its CA configuration. This signaling may be a general indication (i.e., it may be up to the UE to then decide how to adapt its CA configuration) or may be a specific indication including a suggested configuration(s) (which may be another CA configuration(s) or a non-CA configuration) for the UE. The UE then performs adaptation of its CA configuration by selecting a target configuration (which may be another CA configuration or a non-CA configuration) and changing its CA configuration to the target configuration, as discussed below. The target configuration is a CA configuration or a non-CA configuration having an uplink resource allocation that is suitable when considering the amount of required uplink resources (Pr) of the UE. Notably, in some embodiments, some other network node may be responsible for managing or controlling the CA configuration of the UE in which case the network node may trigger adaptation of the CA configuration of the UE by that other network node.

In other embodiments, rather than triggering adaptation, the network node performs adaptation of the CA configuration of the UE. More specifically, as discussed below, the network node selects a target configuration for the UE and configures the UE with the target configuration.

FIG. 5 illustrates a similar process for a UE (e.g., the wireless device 14) according to some embodiments of the present disclosure. As illustrated, the UE determines a current or expected uplink resource usage by the UE (step 200). In this step, the UE determines a current or expected uplink resource usage by the UE. The uplink resource usage can be determined based on one or more of the following:

- Uplink rate based on measurement, e.g., average uplink bit rate obtained or logged over the last certain time period,
- Uplink rate based on statistics or historical data related to previous uplink transmissions,
- UE buffer size, expected data rate, etc.
- Implicit determination based on downlink data rate. Downlink transmission also requires a certain amount of uplink resources depending upon service. For example, the UE may determine that the expected uplink data rate is 10-15% of the downlink data rate if it is best effort. Conversely, if the downlink data rate is voice over IP, then the downlink data rate is the same as the uplink data rate.

The UE determines an amount of required uplink resources (Pr) for the UE based on the determined current or expected uplink resource usage by the UE (step 202). More specifically, the UE translates or maps the determined current or expected uplink resources into the amount of required uplink resources (Pr). The UE may map the determined current or expected uplink resource usage of step 200 (e.g., a determined data rate) into the amount of required uplink resources (Pr). Examples of physical resources are RBs, resource elements, virtual RBs, physical RBs, etc. The mapping can be based on, for example, pre-defined tables that also take into account the MCS used for transmission, etc. For example, the UE may determine that in order to achieve up to 1 Mbps in the uplink, the UE needs up to at least 25 RBs in uplink. Notably, in some alternative embodiments, steps 200 and 202 are not performed by the UE. Rather, the network node determines the amount of required uplink resources (Pr) and sends the amount of required uplink resources (Pr) to the UE.

The UE determines whether to trigger or perform (depending on the embodiment) adaptation of the CA configuration of the UE based on the amount of required uplink resources (Pr) required by the UE and a maximum number of uplink resources (Pc) of the current CA configuration of the UE (step 204). In some embodiments, the UE compares the amount of required uplink resources (Pr) with the maximum number of uplink resources (Pc) of the current CA configuration of the UE. The maximum number of uplink resources (Pc) is the maximum number of uplink physical resources that can be allocated for the operating carrier(s) of the UE. For example, if the UE is operating on band 3 with NC-CA mode (e.g., 20 MHz+20 MHz channel bandwidth), then the maximum RBs are limited to 16 RBs for certain Wgaps between the CCs, i.e. Pc=16 RBs. The UE can determine the maximum number of uplink resources (Pc) based on the pre-defined information associated with the current CA configuration of the UE. The UE may compare the amount of required uplink resources (Pr) with the maximum number of uplink resources (Pc) for the UE in case the UE is operating in CA, i.e., if the UE is configured with a PCC and at least one SCC. In this case, the UE may compare the amount of required uplink resources (Pr) with the maximum number of uplink resources (Pc) for at least the PCC.

Examples of generalized comparison functions that can be used by the network node are as follows:

$$Y1 = f(Pr, Pc) \quad (1)$$

$$Y2 = f(Pr, Pc, h) \quad (2)$$

where h is a resource offset parameter that may, for example, be pre-defined or configured by the network (e.g., by the network node). Further, the value for h may, in some embodiments, depend upon Pr or Pc. For example, if difference between Pr and Pc is large (e.g., more than 20 RBs) then h can be set to a smaller value, e.g. h=2. But if difference between Pr and Pc is smaller (e.g., not more than 6 RBs) then h can be set to a larger value, e.g. h=10. Otherwise h can be ignored, e.g. h=0. The UE can use any of the above functions to decide whether there is a need to perform adaptation of the CA configuration of the UE due to lack of uplink physical resources within the current CA configuration of the UE. This can be explained with specific examples. As a first example, using Equation (1) above, the function f(Pr, Pc) may be defined such that the UE decides that adaptation of the CA configuration of the UE should be performed if Pr>Pc. In another example, using Equation (2) above, the function f(Pr, Pc, h) may be defined such that the UE decides that adaptation of the CA configuration of the UE should be performed if Pr>(Pc+h).

If the UE determines that adaptation of the CA configuration of the UE should not be performed, the process ends. Otherwise, if the UE determines that adaptation of the CA configuration of the UE should be performed, the UE triggers or performs adaptation of the CA configuration of, or for, the UE (step 206). With respect to triggering adaptation of the CA configuration of the UE, the UE triggers adaptation of the CA configuration of the UE by some other node (e.g., the network node) that is responsible for controlling the CA configuration of the UE. More specifically, in some embodiments, the UE transmits a message or other signaling to the network node indicating to the network node that the CA configuration of the UE should be adapted. This signaling may be a general indication (i.e., it may be up to the network node to then decide how to adapt the CA configuration of the UE) or may be a specific indication including a suggested configuration(s) (which may be another CA configuration(s) or a non-CA configuration) for the UE. The network node then performs adaptation of the CA configuration of the UE by selecting a target configuration (which may be another CA configuration or a non-CA configuration) and changing the CA configuration of the UE to the target configuration, as discussed below. The target configuration is a CA configuration or a non-CA configuration having an uplink resource allocation that is suitable when considering the amount of required uplink resources (Pr) of the UE.

In other embodiments, rather than triggering adaptation, the UE performs adaptation of the CA configuration of the UE. More specifically, as discussed below, the network node selects a target configuration (which may be another CA configuration or a non-CA configuration) for the UE and configures the UE with the target configuration.

Figure 6:
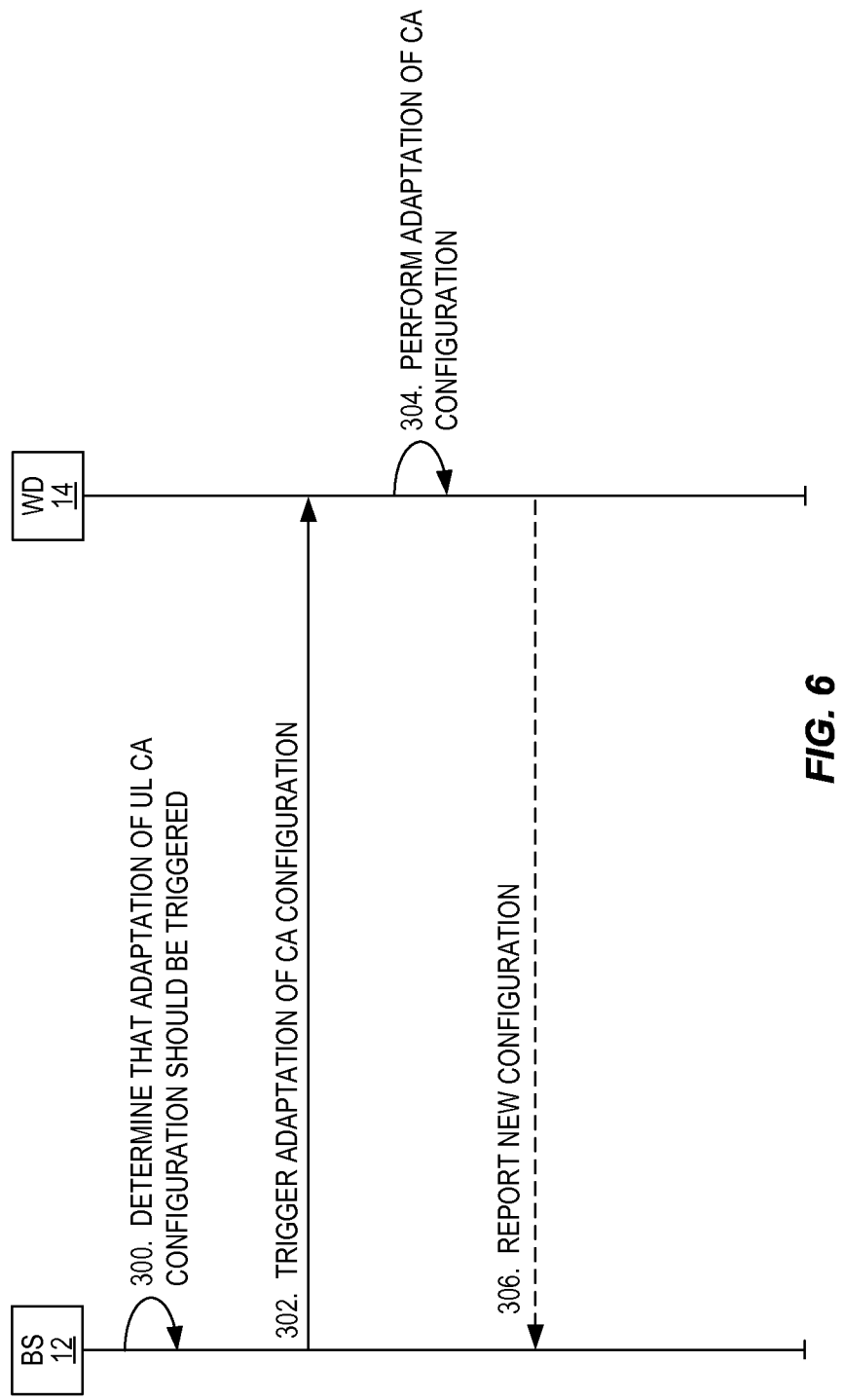
FIG. 6 illustrates one example procedure in which the base station of FIG. 3 triggers adaptation of a CA configuration of the wireless device according to, e.g., the process of FIG. 4 according to some embodiments of the present disclosure.

FIG. 6 illustrates one example in which the base station 12 triggers adaptation of the CA configuration of the wireless device 14 according to, for instance, the process of FIG. 4 according to some embodiments of the present disclosure. As illustrated, the base station 12 determines that adaptation of the CA configuration of the wireless device should be triggered (step 300). This decision may be made according to, for example, steps 100, 102, and 106 of FIG. 4. Upon making this determination, the base station 12 triggers adaptation of the CA configuration of the wireless device 14 (step 302). As illustrated, this is done by sending a message or other indication to the wireless device 14 that the wireless device 14 should adapt its CA configuration. The indication sent to the wireless device 14 may be a general indication, in which case it is up to the wireless device 14 to determine how to adapt its CA configuration (e.g., using the amount of required uplink resources (Pr) which may be provided to the wireless device 14 from the base station 12 as part of the indication triggering adaptation, provided from the base station 12 to the wireless device 14 separately, or determined by the wireless device 14). The indication sent to the wireless device 14 may alternatively be a specific indication that includes one or more suggested target configurations for the wireless device 14.

In response to the trigger, the wireless device 14 performs adaptation of the CA configuration of the wireless device 14 (step 304). As discussed below, the wireless device 14 selects a target configuration, which may be a CA configuration or a non-CA configuration, and then changes the CA configuration of the wireless device 14 to the target configuration. In some embodiments, the wireless device 14 reports the new configuration of the wireless device 14 to the base station 12 (step 306).

Figure 7:
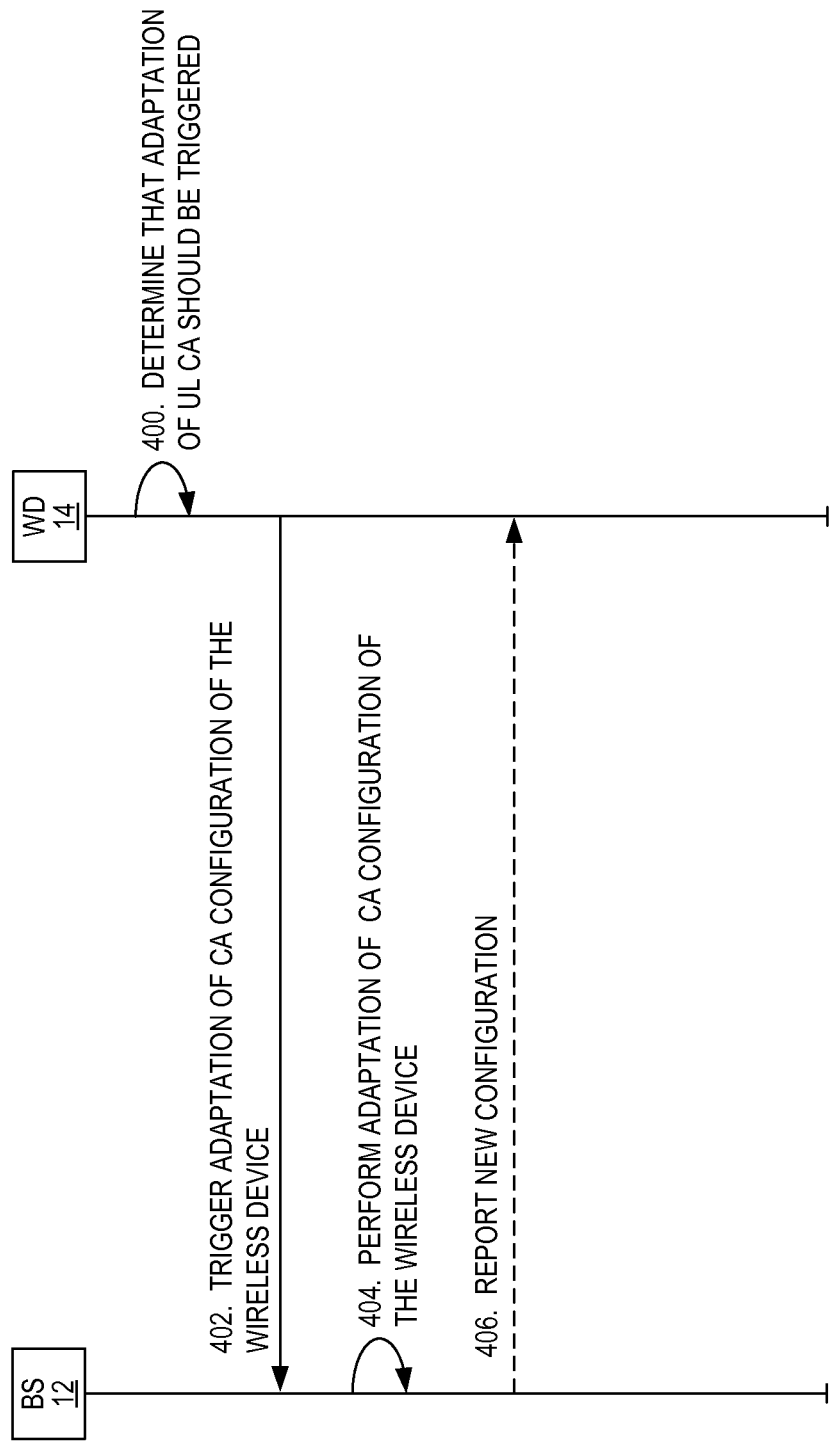
FIG. 7 illustrates one example procedure in which the wireless device of FIG. 3 triggers adaptation of a CA configuration of the wireless device according to, e.g., the process of FIG. 5 according to some embodiments of the present disclosure.

FIG. 7 illustrates one example in which the wireless device 14 triggers adaptation of the CA configuration of the wireless device 14 according to, for instance, the process of FIG. 5 according to some embodiments of the present disclosure. As illustrated, the wireless device 14 determines that adaptation of the CA configuration of the wireless device should be triggered (step 400). This decision may be made according to, for example, steps 200-204 of FIG. 5. Upon making this determination, the wireless device 14 triggers adaptation of the CA configuration of the wireless device 14 by the base station 12 (step 402). As illustrated, this is done by sending a message or other indication to the base station 12 that the CA configuration of the wireless device 14 should be adapted. The indication sent to the base station 12 may be a general indication in which case it is up to the base station 12 to determine how to adapt CA configuration (e.g., using the amount of required uplink resources (Pr) which may be determined by the base station 12 as discussed above). The indication sent to the base station 12 may alternatively be a specific indication that includes one or more suggested target configurations for the wireless device 14.

In response to the trigger, the base station 12 performs adaptation of the CA configuration of the wireless device 14 (step 404). As discussed below, the base station 12 selects a target configuration, which may be a CA configuration or a non-CA configuration, and then changes the CA configuration of the wireless device 14 to the target configuration. In some embodiments, the base station 12 reports the new configuration of the wireless device 14 to the wireless device 14 (step 406).

Embodiments for performing adaptation of the CA configuration of the UE based on the amount of required uplink resources (Pr) of the UE are also disclosed. Adaptation of the CA configuration of the UE may be performed by the network node or the UE, depending on the particular embodiment. In some embodiments, this process is performed after CA configuration is triggered by either the network node (e.g., according to the process of FIG. 4 wherein the action in step 108 is triggering adaptation of the CA configuration of the UE) or triggered by the UE (e.g., according to the process of FIG. 5 where the action in step 206 is triggering adaptation of the CA configuration of the UE). In other embodiments, this process is performed by the same node that determined that CA configuration should be performed (e.g., according to the process of FIG. 4 where the action in step 108 is performing adaptation of the CA configuration of the UE or according to the process of FIG. 5 where the action in step 206 is performing adaptation of the CA configuration of the UE).

Notably, if the UE is in RRC connected state, the process of performing adaptation of the CA configuration of the UE is, in some embodiments, performed by the network node (e.g., the serving network node). Conversely, if the UE is in RRC idle state, the process of performing adaptation of the CA configuration of the UE is, in some embodiments, performed by the UE autonomously, e.g., based on pre-defined rule(s). In the latter case, the UE may also receive one or more parameters from the network node, e.g., thresholds for comparing the uplink resource usage, etc. The UE-based adaptation of the CA configuration, however, may also be performed in the connected state.

In some embodiments, the first node or UE, after deciding to adapt the CA configuration of the UE, sends a message or indication to the UE requesting the said UE to change its current (first) CA configuration, e.g., a RRC reconfiguration message is sent using RRC protocol.

The CA configuration adaptation herein may be performed for any of the following scenarios:
 From a first (i.e., currently serving) CA configuration (e.g., CAConfig1) to a second CA configuration (e.g., CAConfig2) or a modified second CA configuration or a single carrier transmission mode where CAConfig1 and CAConfig2 may operate on the same set of carriers (e.g., in both cases PCC and SCC operate on f1 and f2 respectively);
 From a first (i.e., current serving) CA configuration on a first set of carriers (e.g., f1 and f2) to a second CA configuration or a modified second CA configuration or a single carrier transmission on a second set of carriers (e.g., f1' and f2') where (f1, f2) and (f1', f2') may belong to the same frequency band or to different frequency bands.
The current (first) CA configuration consists of a PCell and at least one SCell, i.e., the UE is served by the PCell and the at least one SCell. For simplicity, embodiments are described for PCC and one SCC on f1 and f2 or f1' and f2', respectively. However the embodiments are applicable to any number of SCells.

In some embodiments, the change from the current (first) CA configuration to the target (second) CA configuration comprises changing, modifying, or adapting one or more parameters of the current (first) CA configuration. Examples of such parameters are number of CCs, changing of PCell and/or SCell, gap in frequency between PCell and SCell and/or between SCells, number of physical resources in downlink and/or uplink, etc. For example, the node may change intra-band NC-CA with 3 DL CCs with 1 UL CC to 2 DL CCs with 1 UL CC. In another example, the node may change intra-band NC-CA with 3 DL CCs to 2 UL CCs to 3 DL CCs with 1 UL CC. In yet another example, the node may limit the maximum number of allocated downlink RBs on SCell in the intra-band NC-CA (e.g., with 2 DL CCs with 1 UL CC) below a threshold (e.g., below 5 downlink RBs).

In some embodiments, the change from the current (first) CA configuration to the target (second) CA configuration comprises changing to a different type of CA configuration compared to the type of the first CA configuration or in a different band compared to the frequency band of the first CA configuration. For example, the node may change intra-band NC-CA to inter-band CA. In yet another example, the node may change intra-band NC-CA in band 5 (850 MHz) to intra-band NC-CA in band 2 (e.g., 1900 MHz).

Figure 8:
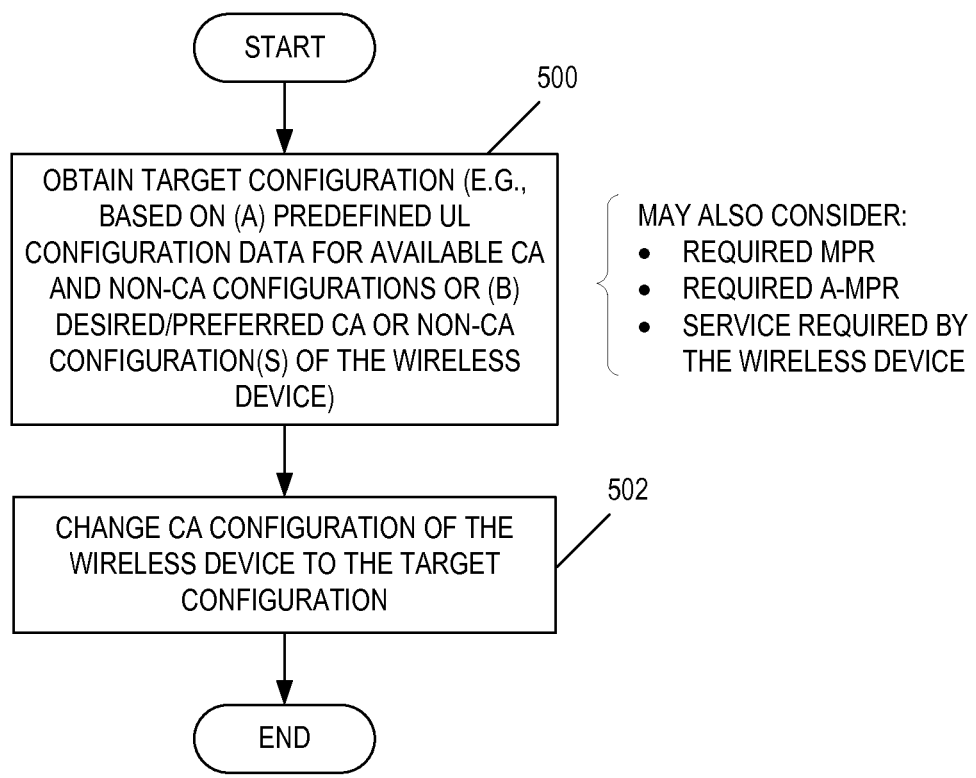
FIG. 8 is a flow chart that illustrates a process for performing adaptation of a CA configuration of a wireless device according to some embodiments of the present disclosure.

FIG. 8 is a flow chart that illustrates a process for performing CA configuration based on the amount of required uplink resources (Pr) of the UE according to some embodiments of the present disclosure. This process may be performed by the network node or the UE, depending on the particular embodiment. In some embodiments, this process is performed after CA configuration is triggered by either the network node (e.g., according to the process of FIG. 4 wherein the action in step 108 is triggering adaptation of the CA configuration of the UE) or triggered by the UE (e.g., according to the process of FIG. 5 where the action in step 206 is triggering adaptation of the CA configuration of the UE). In other embodiments, this process is performed by the same node that determined that CA configuration should be performed (e.g., according to the process of FIG. 4 where the action in step 108 is performing adaptation of the CA configuration of the UE or according to the process of FIG. 5 where the action in step 206 is performing adaptation of the CA configuration of the UE). Note, however, that the process of FIG. 8 is not limited to being performed in connection with the process of FIG. 4 or FIG. 5. The process of FIG. 8 may be performed by the network node or the UE as desired.

As illustrated, the node obtains a target configuration for the UE (step 500). The target configuration may be either a CA configuration or a non-CA configuration. The node obtains the target configuration based on the amount of required uplink resources (Pr) of the UE, which as discussed above may be determined based on various information such as, for example, a number of uplink resource requests received/made by the UE. In general, the target configuration is selected based on the amount of required uplink resources (Pr) of the UE and pre-defined data regarding different CA and possibly non-CA configurations available for the UE (e.g., the uplink resource allocations of the different CA and possibly non-CA configurations available to the UE). In addition, in some embodiments, one or more preferred or desired configurations of the UE are known to the node, in which case the node may consider the preferred or desired configurations of the UE when selecting the target configuration for the UE.

The target configuration can be a modified version of the current CA configuration, a different CA configuration, or a non-CA configuration. In some embodiments, the target configuration is a configuration with an uplink transmission configuration having an uplink resource allocation (e.g., maximum allowable number of RBs) that is greater than or equal to some pre-defined threshold, which can be equal to Pr or a value which is a function of Pr, e.g. Pr+h.

In some embodiments, the current CA configuration is an intra-band NC-CA configuration with M component carriers, and the target configuration is an intra-band-NC-CA configuration with N carriers, where N<M, e.g., N=2 and M=3 with two adjacent carriers. In some embodiments, the current CA configuration is an intra-band non-contiguous configuration with X frequency gaps, and the target CA configuration is an intra-band NC-CA configuration with Y frequency gaps, where Y<X, e.g., Y=1 and X=2. In some embodiments, the current CA configuration is an intra-band NC-CA configuration, and the target configuration is an intra-band contiguous CA configuration, e.g., NC-CA and contiguous CA configurations both in the same frequency band, e.g., band 4. In some embodiments, the current CA configuration is an intra-band NC-CA configuration and the target configuration is an inter-band contiguous CA configuration, e.g., NC-CA in band 4 and inter-band CA in bands 4 and 14.

In some embodiments, the target configuration is either a CA configuration or a non-CA configuration. In some embodiments, the node selects either the CA configuration or the non-CA configuration depending on which satisfies the amount of required uplink resources (Pr) of the UE (e.g., depending on which has a maximum number of allowed uplink RBs that is greater than or equal to the amount of required uplink resources (Pr)). Particularly if both can satisfy the amount of required uplink resources (Pr) of the UE, the node may select the one that has the greatest maximum allowable RBs (i.e., which has the highest uplink resource allocation). In other embodiments, if both a CA configuration and a non-CA configuration satisfy the amount of required uplink resources (Pr) requirements of the UE, the node always selects the non-CA configuration. However, in other embodiments, if both a CA configuration and a non-CA configuration satisfy the amount of required uplink resources (Pr) requirements of the UE, the node always selects the CA configuration provided that the current CA configuration and this CA configuration (i.e., the potential target CA configuration) are in the same frequency band.

The node may also consider additional parameters or information when selecting the target configuration for the UE. For example, when selecting the target configuration for the UE, the node may consider MPR and A-MPR, UE buffer status, and/or a type of service required by the UE in the uplink.

Once the node has selected the target configuration of the UE, the node changes, or adapts, the CA configuration of the UE from the current (first) CA configuration to the target configuration (step 502). This change in configuration can be performed using any suitable technique such as, for example, the techniques currently used in 3GPP LTE for configuring CA for the UE. However, the specific manner in which the CA configuration is changed may vary depending on the particular implementation.

In some embodiments, the node is the network node, and the network node can determine the target configuration of the UE as follows. The network node can compare the uplink resource request (e.g., the number of required uplink RBs) from the UE with the uplink transmission configuration of the currently serving CA configuration (i.e., the first CA configuration). If the required number of physical resources (e.g., uplink RBs) exceeds the uplink resource allocation of the current CA configuration (e.g., uplink RBs in the uplink PCell and/or uplink SCell) by a certain threshold, then the network node may determine a second CA configuration or a single carrier CA as the target configuration for the UE. With the pre-defined knowledge of other allowed uplink resources for other CA configurations, the network node may identify the second CA configuration or single carrier configuration for use by the UE, i.e., a target CA configuration.

In other embodiments, the network node requests from the UE which configuration (i.e., a second CA or single carrier configurations) it prefers for transmitting the amount of required uplink resources (Pr) or more RBs in uplink. Then, the UE can recommend one or more second configurations. The UE recommendation of uplink RBs can be based on expected uplink data rate, amount of data in its buffer, etc. The UE may recommend one or even more than one candidate configuration. In the former case, the network node may select the UE recommended configuration. In the latter case, based on the recommended candidates from the UE, the network node selects the most suited configuration (e.g., second CA or single carrier configuration) for the UE and for the network node. The selected configuration is one of the pre-defined configurations in the standard and contains uplink RBs that meets the requirements of the UE in terms of the required uplink RBs and which the network node is also able to use.

Figure 9:
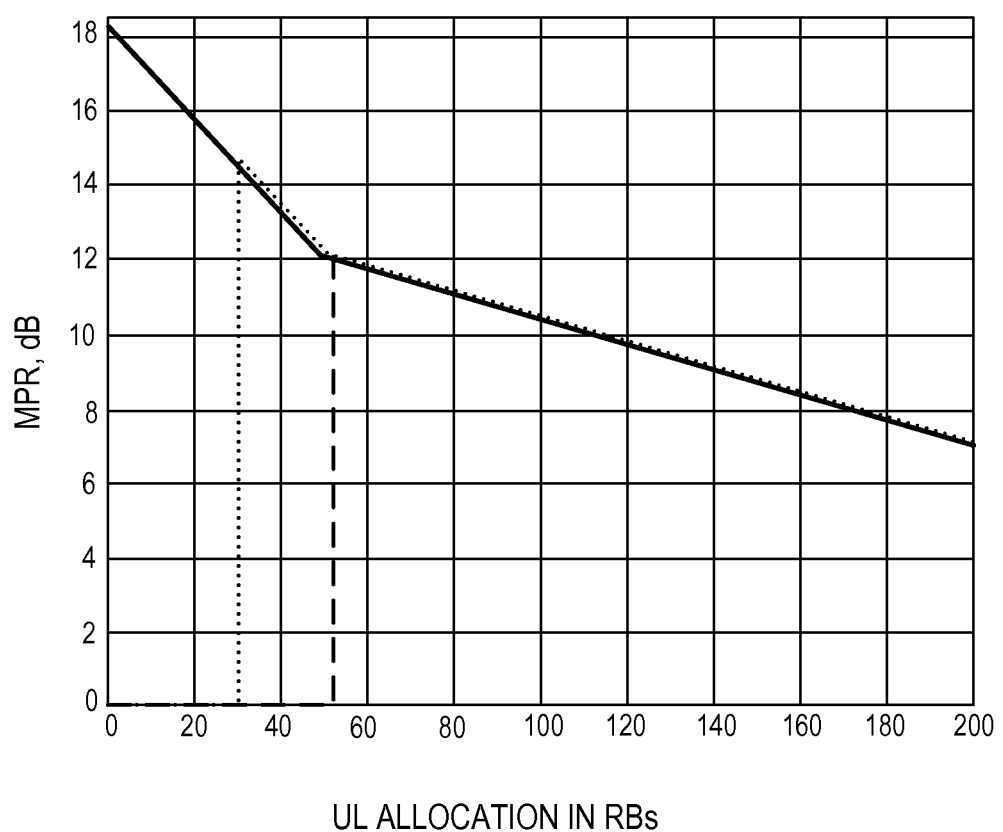
FIG. 9 illustrates an example Maximum Power Reduction (MPR) value for adapting a CA configuration of a wireless device according to some embodiments of the present disclosure.

In some embodiments, the CA configuration of the UE is adapted based on a required MPR that is specified in the specification. In case of CA, the UE receives on more than one serving cell operating on different component carriers. MPR is the amount of power backoff that the UE has to apply on its transmit power. The power backoff ensures that the UE transmission on one or more serving cell(s) does not cause emissions which violates the minimum leakage requirements as specified in UE transmitter specification (i.e., 3GPP TS 36.101) An example of MPR is shown in FIG. 9 by the dark solid line. FIG. 9 is a graph illustrating an example MPR value for adapting CA configuration. In this example, when the required uplink resources by the UE are below 25 RBs in case of 5+5 MHz NC-CA combination (as shown by the dotted line), then the UE can be configured to transmit only in one UL CC, effectively adapting to single carrier uplink transmission from 2 uplink NC-CA combination. Similarly, if the UE is scheduled for 10+10 MHz NC-CA combination, then the UE can be configured to one uplink case, as shown by the dashed line in FIG. 9, thereby avoiding a huge backoff requirement. In other embodiments, A-MPR could provide such constraints and, therefore, similar solutions can be adopted as described above with respect to the example of FIG. 9. A MPR is general band specific and, depending on the CA configuration, the A-MPR can even be different for the same band. A-MPR is usually signaled by the network to the UE.

In some embodiments, when intra-band NC-CA is used, if uplink traffic is prioritized and if the ratio of maximum allowed uplink physical channels (e.g., uplink RBs) and uplink grant request is higher compared to a threshold, then the UE can be configured to transmit in non-CA mode. In this case, a higher number of uplink physical channels (e.g., 50 or more) can be used for uplink transmission of the UE. More specifically, in this case, the UE will be configured in single downlink and single uplink carrier configuration (i.e. non-CA configuration).

As one example alternative to the above solution, the UE can be kept in intra-band NC-CA mode, but the downlink resources (e.g., downlink RBs) transmitted to the UE in one or more SCells are reduced, resulting in single carrier downlink transmission from 2 downlink NC-CA or 2 downlink contiguous CA, or in 2 downlink NC-CA or contiguous CA transmission from 3 downlink NC-CA, or contiguous CA transmission. As a special case, the network node does not allocate any downlink resources in downlink SCC. There exists a relationship between the maximum number of downlink resources on downlink SCell(s) and uplink resources on uplink PCell and/or uplink SCell. Such relationship is pre-defined or is based on historical data. The reduction or avoidance of downlink resources in downlink SCell (s) in turn allows the network node to allocate higher number of uplink physical channels (e.g., uplink RBs) to the UE. As an example, the maximum allowed uplink RBs in band 3 is specified as 16 RBs, when 2 downlink NC-CA is used for 20+20 MHz case. However, in a single carrier uplink transmission, maximum 50 RBs are allowed for band 3 uplink transmission. Thus, when the UE requires more than 16 RBs, then the CA mode could be adapted from 2 downlink NC-CA to single carrier transmission.

In some embodiments, the CA configuration of the UE is adapted based on a service required by the UE. In these embodiments, the node determines what type of service is used by the UE, for example, in terms of data rate required in downlink and/or uplink. Where the node performing the adaptation is the network node, the network node can determine the service type based on an indication received from the UE and/or from another network node (e.g., a core network node) and/or by reading higher layer packets (containing serving related information) transmitted between UE and the network node. As an example, if the service requires high data rate in the downlink, then the node may use a second CA configuration with larger bandwidth (e.g., 50 RBs or more) or more downlink carriers (e.g., 2 or more SCells) or single carrier CA with larger bandwidth. But if the UE requires higher data rate in the uplink, then the node may select a CA configuration that allows larger number of uplink RBs.

Figure 10:
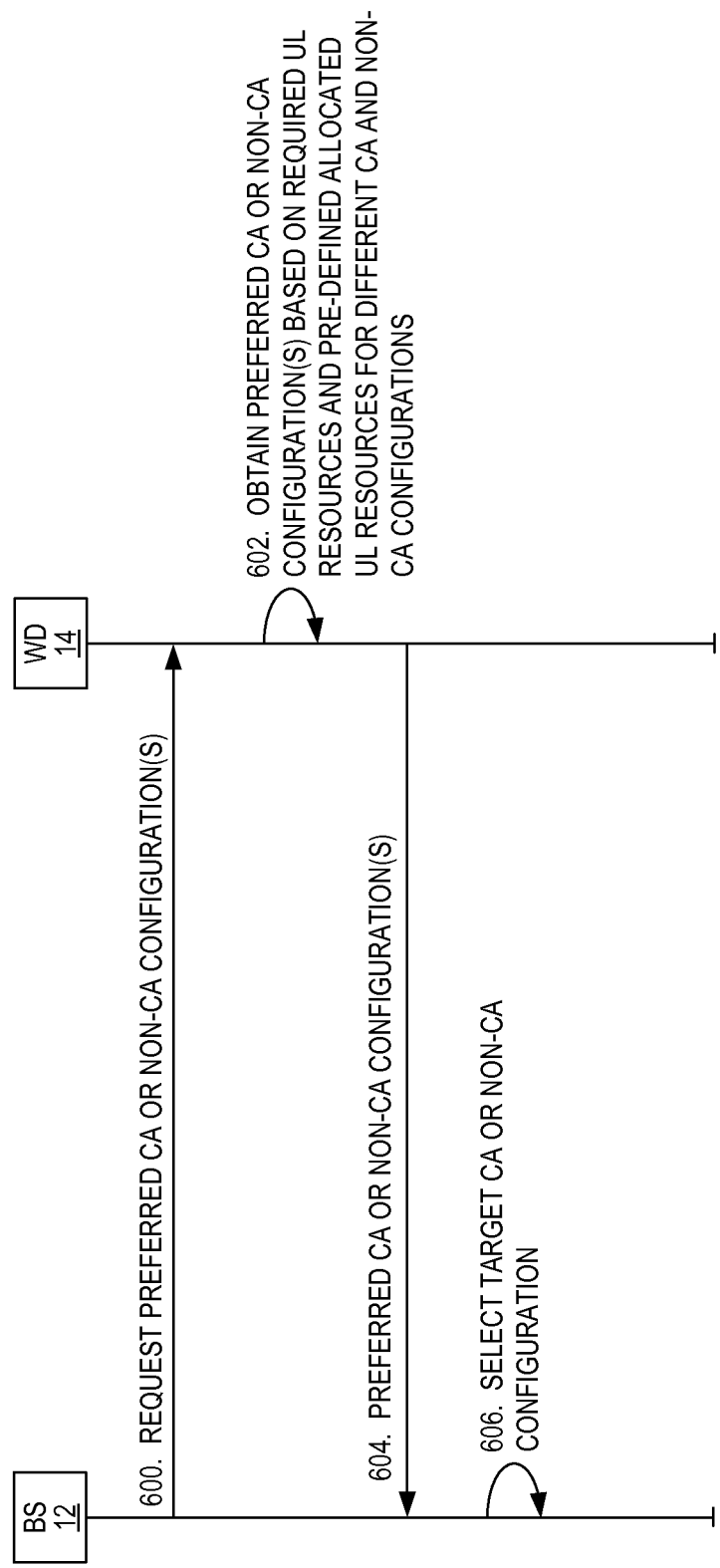
FIG. 10 illustrates the operation of the base station of FIG. 3 to select a target configuration for the wireless device based on one or more preferred, or recommended, configurations of the wireless device according to some embodiments of the present disclosure.

As discussed above, in some embodiments, adaptation is performed by the network node. Further, in some embodiments, the network node selects the target configuration for the UE based on an indication of one or more preferred configurations of the UE. In this regard, FIG. 10 illustrates the operation of the base station 12 (e.g., a network node) to select a target configuration for the wireless device 14 (e.g., a UE) based on one or more preferred, or recommended, configurations of the wireless device 14. As illustrated, the base station 12 requests a preferred CA or non-CA configuration(s) from the wireless device 14 (step 600). The wireless device 14 obtains a preferred CA or potentially non-CA configuration(s) of the wireless device 14 based on, e.g., the amount of required uplink resources (Pr) of the wireless device 14 and pre-defined allocated uplink resources for different CA and non-CA configurations (step 602). The wireless device 14 then sends an indication of the preferred CA or non-CA configurations to the base station 12 (step 604). The base station 12 then selects a target CA or non-CA configuration for the wireless device 14, as discussed above (step 606). Notably, in this example, the preferred and target configurations may be CA or non-CA configurations. However, in other embodiments, only CA configurations may be considered.

As discussed above, depending on the embodiment, either the network node or the UE may perform adaptation of the CA configuration of the UE (e.g., autonomously denying any uplink transmission on SCC) based on at least uplink resource usage of the CA configuration according to any of the embodiments disclosed herein. The UE may also inform the network node about the adapted CA configuration (i.e., the target, or new (second) CA configuration or single carrier configuration). The network node may then use the received indication or information from the UE for serving the UE, i.e., by using parameters associated with the new configuration (e.g., second CA configuration).

Figure 11:
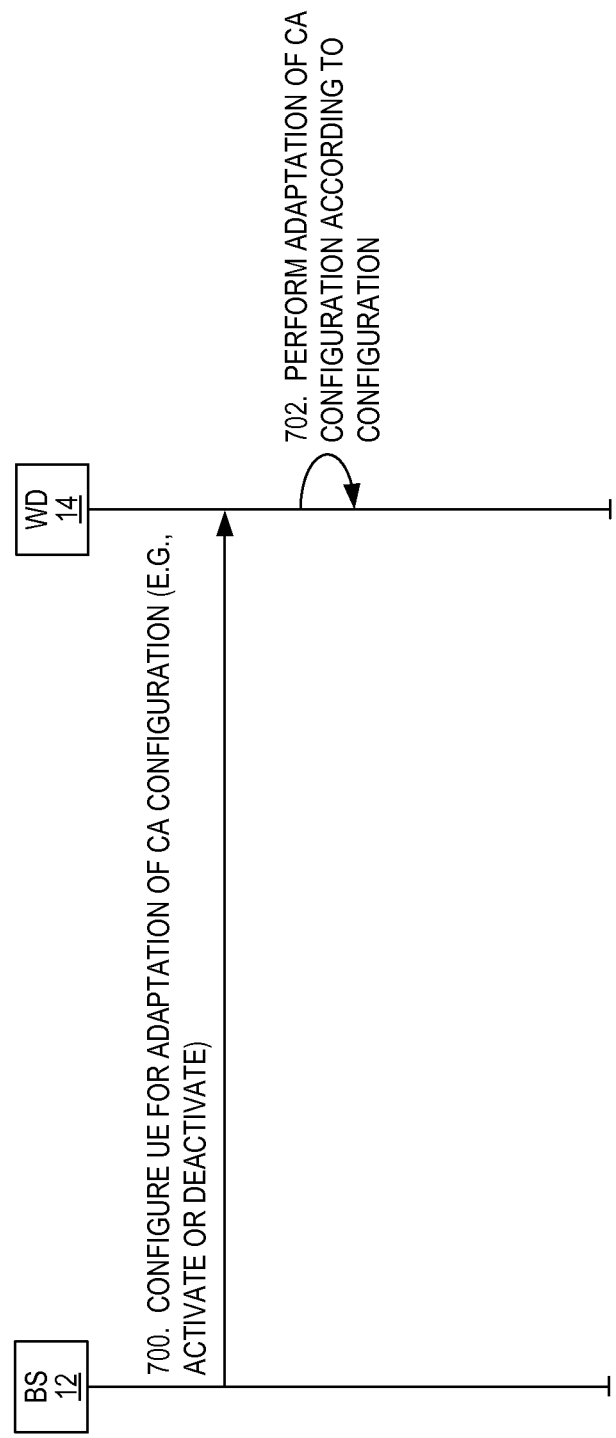
FIG. 11 illustrates the operation of a network node (e.g., the base station of FIG. 3) to send an explicit indication to the wireless device to either activate or deactivate CA configuration adaptation according to some embodiments of the present disclosure.

According to another aspect of the present disclosure, in embodiments where the UE performs autonomous adaptation of its CA configuration, the network node may decide to activate or deactivate UE-based CA configuration adaptation. For example this can be realized or enforced by the network node by sending an indicator (0 or 1) to the UE informing the UE whether the UE is allowed or not to autonomously adapt its CA configuration. For example, when allowed by the network node, the UE may autonomously change its current CA configuration to a new CA configuration in order to meet, for example, its data rate requirements. In this case, as illustrated in FIG. 11, the network node (e.g., the base station 12) may send an explicit indication to the UE as to whether the UE-based CA configuration adaptation is activated or deactivated (step 700). Based on the received indication, the UE (e.g., the wireless device 14) may decide whether to autonomously adapt from the first CA configuration to the second CA configuration or single carrier configuration according to any of the embodiments described herein (step 702). The default UE behavior with respect to the adaptation of CA configuration may also be pre-defined. For example, it may be pre-defined that by default the UE shall not autonomously adapt its CA unless explicitly indicated.

Figure 12:
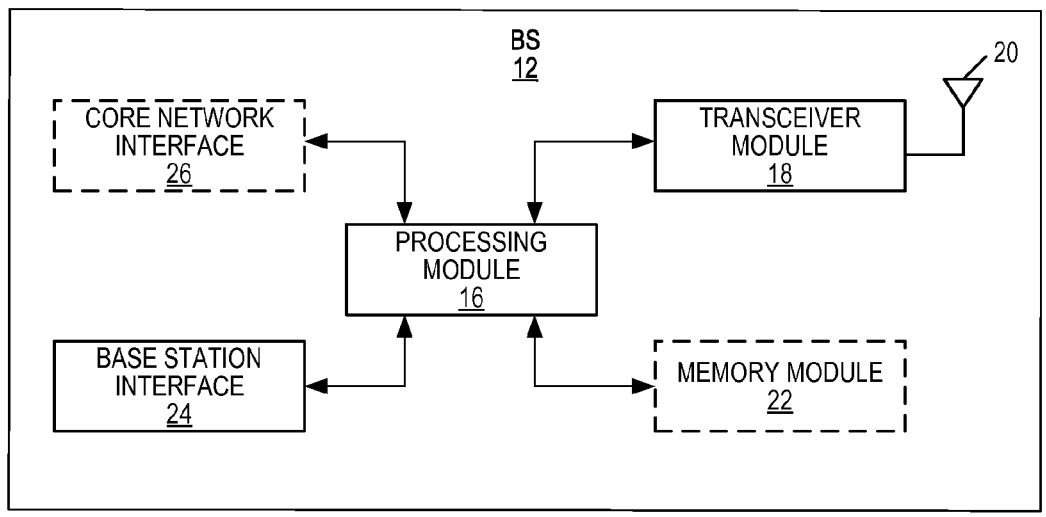
FIG. 12 is a block diagram of a base station according to some embodiments of the present disclosure.

FIG. 12 shows the base station 12 (for example a Node B or an eNB) according to some embodiments of the present disclosure. It will be appreciated that although a macro eNB will not in practice be identical in size and structure to a micro eNB, for the purposes of illustration both are to be considered base stations 12 and are assumed to include similar components. Thus, the base station 12 comprises a processing module 16 that controls the operation of the base station 12. As will be appreciated by one of ordinary skill in the art, the processing module 16 includes one or more processor circuits (e.g., Central Processing Units (CPUs), Application Specific Integrated Circuits (ASICs), and/or Field Programmable Gate Arrays (FPGAs)). The processing module 16 is connected to a transceiver module 18 with associated antenna(s) 20 which are used to transmit signals to, and receive signals from, wireless devices 14 in the cellular communications network 10. As will be appreciated by one of ordinary skill in the art, the transceiver module 18 includes one or more transmitters and one or more receivers, each including corresponding circuitry (e.g., filters, mixers, amplifiers, etc.). The base station 12 also comprises, in some embodiments, a memory module 22 (e.g., one or more memory circuits) that is connected to the processing module 16 and that stores program and other information and data required for the operation of the base station 12. The base station 12 also includes components and/or circuitry 24 (e.g., a base station interface) for allowing the base station 12 to exchange information with other base stations 12 (for example via an X2 interface) and components and/or circuitry 26 (e.g., a core network interface) for allowing the base station 12 to exchange information with nodes in a core network (for example via the S1 interface). It will be appreciated that base stations 12 for use in other types of networks (e.g., a Universal Terrestrial Radio Access Network (UTRAN) or WCDMA Radio Access Network (RAN)) will include similar components to those shown in FIG. 12 and appropriate interface circuitry 24, 26 for enabling communications with the other network nodes in those types of networks (e.g., other base stations, mobility management nodes, and/or nodes in the core network).

Figure 13:
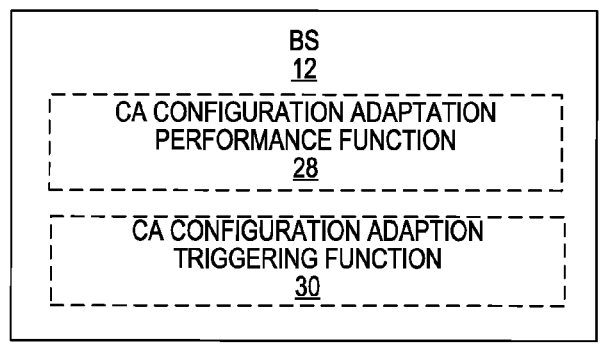
FIG. 13 is a block diagram of a base station according to some other embodiments of the present disclosure.

FIG. 13 is a block diagram of the base station 12 according to some other embodiments of the present disclosure. As illustrated, the base station 12 includes, in some embodiments, a CA configuration adaptation performance function 28 and/or a CA configuration adaptation triggering function 30, each of which is implemented in software. The CA configuration adaptation performance function 28 operates to adapt the CA configurations of one or more wireless devices 14 served by the base station 12 according to any of the embodiments described herein. The CA configuration adaptation triggering function 30 operates to trigger adaptation of the CA configurations of one or more wireless devices 14 served by the base station 12 according to any of the embodiments described herein.

In some embodiments, a computer program including instructions which, when executed by at least one processor, causes the at least one processor to carry out the functionality of the base station 12 (or more generally network node) according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as memory).

Figure 14:
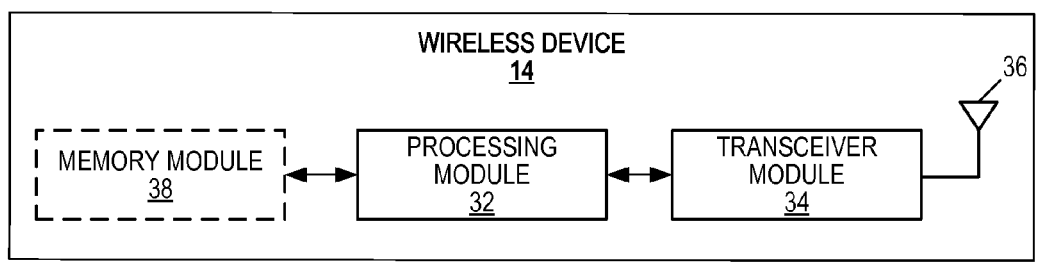
FIG. 14 is a block diagram of a wireless device according to some embodiments of the present disclosure.

FIG. 14 is a block diagram of the wireless device 14 (e.g., UE) according to some embodiments of the present disclosure. The wireless device 14 may in some embodiments be a mobile device that is configured for M2M or Machine-Type Communication (MTC), but is not limited thereto. The wireless device 14 comprises a processing module 32 that controls the operation of the wireless device 14. As will be appreciated by one of ordinary skill in the art, the processing module 32 includes one or more processor circuits (e.g., CPUs, ASICs, and/or FPGAs). The processing module 32 is connected to a receiver or transceiver module 34 with associated antenna(s) 36 which are used to receive signals from or both transmit signals to and receive signals from the base station 12 in the cellular communications network 10. As will be appreciated by one of ordinary skill in the art, the transceiver module 34 includes one or more transmitters and one or more receivers, each including corresponding circuitry (e.g., filters, mixers, amplifiers, etc.). The wireless device 14 also comprises, in some embodiments, a memory module 38 (e.g., one or more memory circuits) that is connected to the processing module 32 and that stores program and other information and data required for the operation of the wireless device 14. The memory module 38 stores instructions that can be executed by the processing module 32. For example, the memory module 38 may store information used for making comparisons, the result of which triggers adaptation of the CA configurations or the performance of adaptation of CA configurations. In some embodiments, the wireless device 14 may optionally comprise a satellite positioning system (e.g., Global Positioning System (GPS)) receiver module (not shown) that can be used to determine the position and speed of movement of the wireless device 14.

Figure 15:
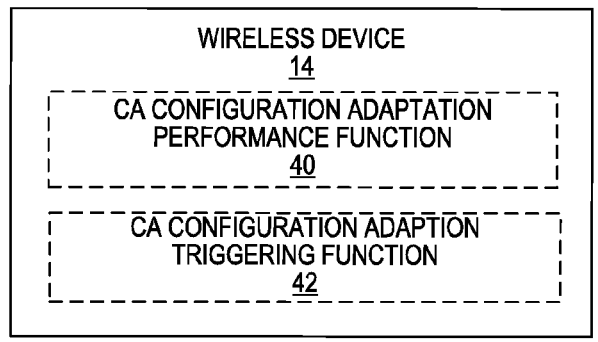
FIG. 15 is a block diagram of a wireless device according to some other embodiments of the present disclosure.

FIG. 15 is a block diagram of the wireless device 14 according to some other embodiments of the present disclosure. As illustrated, the wireless device 14 includes, in some embodiments, a CA configuration adaptation performance function 40 and/or a CA configuration adaptation triggering function 42, each of which is implemented in software. The CA configuration adaptation performance function 40 operates to adapt the CA configuration of the wireless device 14 (e.g., autonomously or as triggered by the base station 12) according to any of the embodiments described herein. The CA configuration adaptation triggering function 42 operates to trigger adaptation of the CA configuration of the wireless device 14 according to any of the embodiments described herein.

In some embodiments, a computer program including instructions which, when executed by at least one processor, causes the at least one processor to carry out the functionality of the wireless device 14 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as memory).

While there are many embodiments described herein, a summary of some of the embodiments disclosed herein is provided as follows. In some embodiments, a network node serving a UE with a first CA configuration operates to obtain an uplink transmission configuration comprising of at least uplink physical channels (K) that can be transmitted by the UE when operating with the first CA configuration; comparing the required number of uplink physical channels (P) that the UE needs to transmit with the K; and if P>K then; configuring the UE with a second configuration, which can be a modified first CA configuration, a second CA configuration different than the first CA configuration or a non-CA configuration, with an uplink transmission configuration comprising of at least uplink physical channels (L) provided L>=H1.

In some embodiments, the first and second CA configurations are intra-band non-contiguous with M carriers and intra-band NC-CA with N carriers respectively, where N<M, e.g., N=2 and M=3 with 2 adjacent.

In some embodiments, the first and second CA configurations are intra-band non-contiguous with X gaps and intra-band NC-CA with Y gaps respectively, where Y<X, e.g., Y=1 and X=2.

In some embodiments, the first and second CA configurations are intra-band non-contiguous and intra-band contiguous CA respectively, e.g., NC-CA and contiguous CA both in same band, e.g. band 4.

In some embodiments, the first and second CA configurations are intra-band non-contiguous and inter-band contiguous CA respectively, e.g., NC-CA in band 4, but inter-band CA is band 4+band 13.

In some embodiments, the network node determines P based on amount of traffic in UE buffer, e.g., buffer size reporting from UE.

In some embodiments, the network node determines P based on the type of service, e.g., large file upload, packet data, etc.

In some embodiments, the network node selects one of second CA configuration and non-carrier CA based on that which also satisfies its respective condition: L>=P and M>=P, where L is the uplink allocation for the second CA configuration and M is the uplink allocation for the non-CA configuration. Further, in some embodiments, the network node selects between second CA configuration and non-CA configuration based on which of L and M are larger. In other embodiments, the network node selects between second CA configuration and non-carrier CA when both satisfy their respective condition by always selecting non-CA. In other embodiments, the network node selects between a second CA configuration and non-CA configuration when both satisfy their respective condition by always selecting the second CA configuration provided that the first and second CA configurations are in the same band.

In some embodiments, the uplink physical channels are RBs.

The embodiments described herein have advantages that are readily apparent from this disclosure. For example, the CA configuration adaptation ensures that the network serves the UE with required uplink data rate. The proposed embodiments also ensure that the most appropriate CA configuration is used by UE to achieve reasonable uplink rate. The proposed embodiments also ensure that, at least in some embodiments, the current CA configuration is adapted only when the required number of uplink physical resources for the UE is below the uplink physical resources available for serving the UE using the current CA configuration of the said UE.

The following acronyms are used throughout this disclosure.
- 3GPP Third Generation Partnership Project
- A-MPR Additional Maximum Power Reduction
- ASIC Application Specific Integrated Circuit
- BW Bandwidth
- CA Carrier Aggregation
- CC Component Carrier
- CPE Customer Premises Equipment
- CPU Central Processing Unit
- D2D Device-to-Device
- DL Downlink
- eNB Enhanced or Evolved Node B
- FDD Frequency Division Duplexing
- FPGA Field Programmable Gate Array
- GERAN Global System for Mobile Communications Enhanced Data Rates for Global System for Mobile Communications Evolution Radio Access Network
- GHz Gigahertz
- GPS Global Positioning System
- GSM Global System for Mobile Communications
- HSPA High Speed Packet Access
- IP Internet Protocol
- LEE Laptop Embedded Equipment
- LME Laptop Mounted Equipment
- LTE Long Term Evolution
- LTE-A Long Term Evolution-Advanced
- M2M Machine-to-Machine
- Mbps Megabits per Second
- MCS Modulation and Coding Scheme
- MHz Megahertz
- MPR Maximum Power Reduction
- MTC Machine-Type Communication
- NC-CA Non-Contiguous Carrier Aggregation
- PCC Primary Component Carrier
- PCell Primary Cell
- RAN Radio Access Network
- RAT Radio Access Technology
- RB Resource Block
- RRC Radio Resource Control
- RRH Remote Radio Head
- RRU Remote Radio Unit
- SCC Secondary Component Carrier
- SCell Secondary Cell
- TDD Time Division Duplexing
- TS Technical Specification
- UE User Equipment
- UL Uplink
- USB Universal Serial Bus
- UTRAN Universal Terrestrial Radio Access Network
- WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operating a node to enable adaptation of a carrier aggregation configuration of a wireless device in a cellular communications network, comprising:
   determining an amount of required uplink resources, Pr, for a wireless device;
   deciding whether adaptation of a carrier aggregation configuration of the wireless device should be performed based on a comparison of the amount of required uplink resources, Pr, for the wireless device and a maximum number of uplink resources, Pc, allocable for the wireless device in a current carrier aggregation configuration of the wireless device; and
   taking an action to cause adaptation of the carrier aggregation configuration of the wireless device upon deciding that adaptation of the carrier aggregation configuration of the wireless device should be performed.

2. The method of claim 1 wherein the adaptation of the carrier aggregation configuration of the wireless device changes the current carrier aggregation configuration of the wireless device to a new configuration, the new configuration being one of a group consisting of: a modified version of the current carrier aggregation configuration, a different carrier aggregation configuration, and a non-carrier aggregation configuration.

3. The method of claim 2 wherein the current carrier aggregation configuration of the wireless device uses a set of carriers, and the new configuration uses the set of carriers of the current carrier aggregation configuration of the wireless device.

4. The method of claim 2 wherein the current carrier aggregation configuration of the wireless device uses a set of carriers, and the new configuration uses a different set of carriers than the set of carriers for the current carrier aggregation configuration.

5. The method of claim 4 wherein the different set of carriers for the new configuration and the set of carriers for the current carrier aggregation configuration are in the same frequency band.

6. The method of claim 4 wherein the different set of carriers for the new configuration and the set of carriers for the current carrier aggregation configuration are in different frequency bands.

7. The method of claim 1 wherein deciding whether adaptation of the carrier aggregation configuration of the wireless device should be performed comprises deciding that adaptation of the carrier aggregation configuration of the wireless device should be performed if the amount of required uplink resources, Pr, for the wireless device is greater than the maximum number of uplink resources, Pc, allocable for the wireless device in the current carrier aggregation configuration of the wireless device.

8. The method of claim 1 wherein deciding whether adaptation of the carrier aggregation configuration of the wireless device should be performed comprises deciding that adaptation of the carrier aggregation configuration of the wireless device should be performed if the amount of required uplink resources, Pr, for the wireless device is greater than a sum of the maximum number of uplink resources, Pc, allocable for the wireless device in the current carrier aggregation configuration of the wireless device and a pre-defined offset.

9. The method of claim 1 wherein taking an action to cause adaptation of the carrier aggregation configuration of the wireless device comprises triggering adaptation of the carrier aggregation configuration of the wireless device upon deciding that adaptation of the carrier aggregation configuration of the wireless device should be performed.

10. The method of claim 1 wherein taking an action to cause adaptation of the carrier aggregation configuration of the wireless device comprises performing adaptation of the carrier aggregation configuration of the wireless device upon deciding that adaptation of the carrier aggregation configuration of the wireless device should be performed.

11. The method of claim 10 wherein performing adaptation of the carrier aggregation configuration of the wireless device comprises:

obtaining a target carrier aggregation configuration for the wireless device; and changing the carrier aggregation configuration of the wireless device to the target carrier aggregation configuration.

12. The method of claim 11 wherein obtaining the target carrier aggregation configuration for the wireless device comprises obtaining the target carrier aggregation configuration for the wireless device based on the amount of required uplink resources, Pr, for the wireless device and pre-defined data for a plurality of potential carrier aggregation configurations for the wireless device.

13. The method of claim 12 wherein the pre-defined data comprises values for a maximum number of uplink resources, Pc, allocable for the wireless device in each of the plurality of potential carrier aggregation configurations for the wireless device.

14. The method of claim 11 wherein the node is a network node, and obtaining the target carrier aggregation configuration for the wireless device comprises:

requesting one or more preferred carrier aggregation configurations from the wireless device;

receiving the one or more preferred carrier aggregation configurations from the wireless device in response to the request; and selecting the target carrier aggregation configuration for the wireless device from the one or more preferred carrier aggregation configurations received from the wireless device.

15. The method of claim 10 wherein performing adaptation of the carrier aggregation configuration of the wireless device comprises selecting one of a new carrier aggregation configuration and a non-carrier aggregation configuration as the new configuration of the wireless device based on which of the new carrier aggregation configuration and the non-carrier aggregation configuration has a maximum uplink allocation that is greater than or equal to the amount of required uplink resources, Pr, of the wireless device.

16. The method of claim 10 wherein performing adaptation of the carrier aggregation configuration of the wireless device comprises selecting one of a new carrier aggregation configuration having a maximum uplink allocation that is greater than or equal to the amount of required uplink resources, Pr, and a non-carrier aggregation configuration that has a maximum uplink allocation that is greater than or equal to the amount of required uplink resources, Pr, as the new configuration of the wireless device.

17. The method of claim 16 wherein the one of the new carrier aggregation configuration and the non-carrier aggregation configuration selected as the new configuration of the wireless device is the one of the new carrier aggregation configuration and the non-carrier aggregation configuration having the greater maximum uplink allocation.

18. The method of claim 16 wherein the one of the new carrier aggregation configuration and the non-carrier aggregation configuration selected as the new configuration of the wireless device is always the non-carrier aggregation configuration.

19. The method of claim 16 wherein the one of the new carrier aggregation configuration and the non-carrier aggregation configuration selected as the new configuration of the wireless device is always a second carrier aggregation configuration provided that the current carrier aggregation configuration and the second carrier aggregation configuration are in the same frequency band.

20. The method of claim 10 wherein performing adaptation of the carrier aggregation configuration of the wireless device comprising changing the carrier aggregation configuration of the wireless device from the current carrier aggregation configuration of the wireless device to a new carrier aggregation configuration, and the current carrier aggregation configuration is an intra-band non-contiguous carrier aggregation configuration with M carriers, the new carrier aggregation configuration is an intra-band non-contiguous carrier aggregation configuration with N carriers, and N<M.

21. The method of claim 10 wherein performing adaptation of the carrier aggregation configuration of the wireless device comprising changing the carrier aggregation configuration of the wireless device from the current carrier aggregation configuration of the wireless device to a new carrier aggregation configuration, and the current carrier aggregation configuration is an intra-band non-contiguous carrier aggregation configuration with X frequency gaps, the new carrier aggregation configuration is an intra-band non-contiguous carrier aggregation configuration with Y frequency gaps, and Y<X.

22. The method of claim 10 wherein performing adaptation of the carrier aggregation configuration of the wireless device comprising changing the carrier aggregation configuration of the wireless device from the current carrier aggregation configuration of the wireless device to a new carrier aggregation configuration, and the current carrier aggregation configuration is an intra-band non-contiguous carrier aggregation configuration and the new carrier aggregation configuration is an intra-band contiguous carrier aggregation configuration.

23. The method of claim 22 wherein a set of carriers for the current carrier aggregation configuration and a set of carriers for the new carrier aggregation configuration are in the same frequency band.

24. The method of claim 10 wherein performing adaptation of the carrier aggregation configuration of the wireless device comprising changing the carrier aggregation configuration of the wireless device from the current carrier aggregation configuration of the wireless device to a new carrier aggregation configuration, and the current carrier aggregation configuration is an intra-band non-contiguous carrier aggregation configuration and the new carrier aggregation configuration is an inter-band contiguous carrier aggregation configuration.

25. The method of claim 1 wherein determining the amount of required uplink resources, Pr, for the wireless device comprises determining the amount of required uplink resources, Pr, for the wireless device based on an amount of traffic in an uplink buffer or expected data rate of the wireless device.

26. The method of claim 1 wherein determining the amount of required uplink resources, Pr, for the wireless device comprises determining the amount of required uplink resources, Pr, for the wireless device based on a type of uplink service required by the wireless device.

27. The method of claim 1 wherein determining the amount of required uplink resources, Pr, for the wireless device comprises determining the amount of required uplink resources, Pr, for the wireless device based on a data rate of the wireless device logged or measured over a certain time period.

28. The method of claim 1 wherein the cellular communications network is a Long Term Evolution, LTE, network, and the uplink resources are resource blocks.

29. The method of claim 1 wherein the node is a network node of the cellular communications network.

30. The method of claim 1 wherein the node is the wireless device.

31. A node operative to enable adaptation of a carrier aggregation configuration of a wireless device in a cellular communications network, comprising:

a transceiver module;

a processing module; and a memory module storing software instructions executable by the processing module whereby the node is operative to:

determine an amount of required uplink resources, Pr, for a wireless device;

decide whether adaptation of a carrier aggregation configuration of the wireless device should be performed based on a comparison of the amount of required uplink resources, Pr, for the wireless device and a maximum number of uplink resources, Pc, allocable for the wireless device in a current carrier aggregation configuration of the wireless device; and take an action to cause adaptation of the carrier aggregation configuration of the wireless device upon deciding that adaptation of the carrier aggregation configuration of the wireless device should be performed.

* * * * *